United States Patent [19]
Akiyama et al.

[11] Patent Number: 5,576,915
[45] Date of Patent: Nov. 19, 1996

[54] MAGNETORESISTIVE HEAD WITH ANTIFERROMAGNETIC SUBLAYERS INTERPOSED BETWEEN FIRST AND SECOND SPIN-VALVE UNITS TO EXCHANGE BIAS INNER MAGNETIC FILMS THEREOF

[75] Inventors: Junichi Akiyama; Hiroaki Yoda, both of Kawasaki; Yuichi Ohsawa; Hitoshi Iwasaki, both of Yokohama, all of Japan

[73] Assignee: Kabushiki Kaisha Toshiba, Kawasaki, Japan

[21] Appl. No.: 472,487

[22] Filed: Jun. 7, 1995

Related U.S. Application Data

[62] Division of Ser. No. 212,865, Mar. 15, 1994, abandoned.

[30] Foreign Application Priority Data

Mar. 15, 1993 [JP] Japan ..................... 5-053495
Sep. 13, 1993 [JP] Japan ..................... 5-227185

[51] Int. Cl.$^6$ ............................................. G11B 5/39
[52] U.S. Cl. ................................................. 360/113
[58] Field of Search ..................................... 360/113

[56] References Cited

U.S. PATENT DOCUMENTS

| | | | |
|---|---|---|---|
| 3,860,965 | 1/1975 | Voegeli | 360/113 |
| 4,103,315 | 7/1978 | Hempstead et al. | 360/113 |
| 4,603,365 | 7/1986 | Nakamura | 360/113 |
| 5,132,859 | 7/1992 | Andricacos et al. | 360/113 |
| 5,134,533 | 7/1992 | Friedrich et al. | 360/113 |
| 5,304,975 | 4/1994 | Saito et al. | 360/113 |
| 5,424,890 | 6/1995 | Suyama et al. | 360/113 |

FOREIGN PATENT DOCUMENTS 53-037204  10/1978  Japan.

Primary Examiner—Stuart S. Levy
Assistant Examiner—Craig A. Renner
Attorney, Agent, or Firm—Oblon, Spivak, McClelland, Maier & Neustadt, P.C.

[57] ABSTRACT

A magnetoresistive head includes an antiferromagnetic portion interposed between first and second spin-valve units. Sense current supply directions through the first and second spin-valve units are perpendicular to a head facing surface of a magnetic recording medium. The first spin-valve unit is formed of a first inner magnetic film, a first outer magnetic film and a nonmagnetic film interposed between and in direct physical contact with the first inner magnetic film and the first outer magnetic film. The second spin-valve unit is formed of a second inner magnetic film, a second outer magnetic film and a nonmagnetic film interposed between and in direct physical contact with the second inner magnetic film and the second outer magnetic film. The antiferromagnetic portion is formed of a first antiferromagnetic sublayer and a second antiferromagnetic sublayer laminated on the first antiferromagnetic sublayer. The first antiferromagnetic sublayer is in contact with the first inner magnetic film to apply a first exchange bias magnetic field to the first inner magnetic film in a direction perpendicular to the head facing surface of the magnetic recording medium. The second antiferromagnetic sublayer is in contact with the second inner magnetic film to apply a second exchange bias magnetic field to the second inner magnetic film in a direction perpendicular to the surface of the magnetic recording medium. The second exchange bias magnetic field has a polarity opposite to that of the first exchange bias magnetic field.

8 Claims, 12 Drawing Sheets

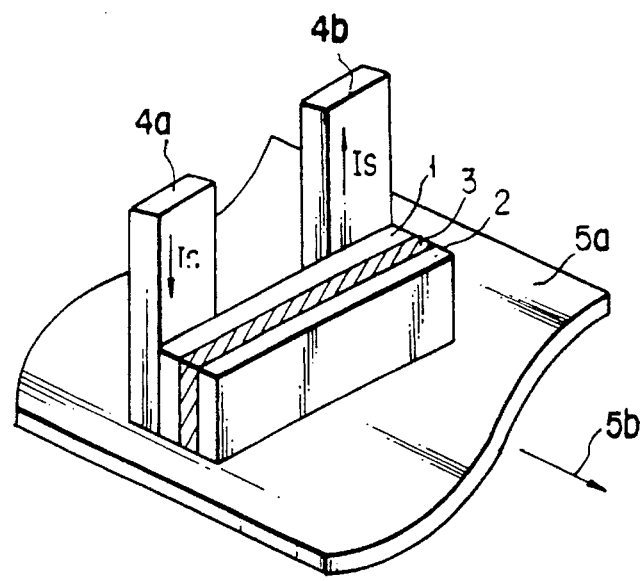
F I G. 1A
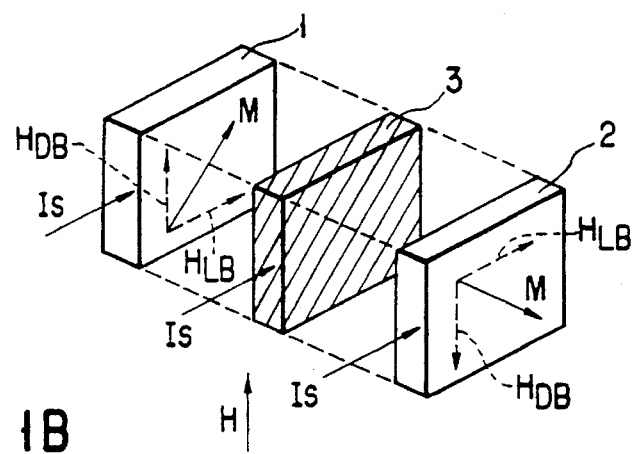
F I G. 1B
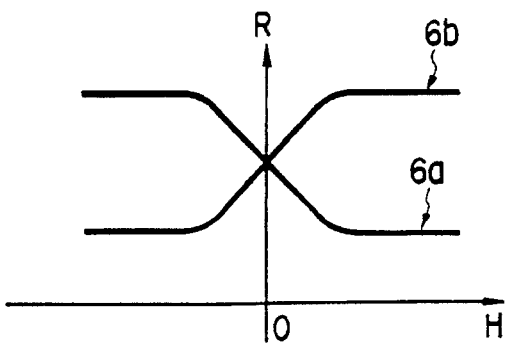
F I G. 1C

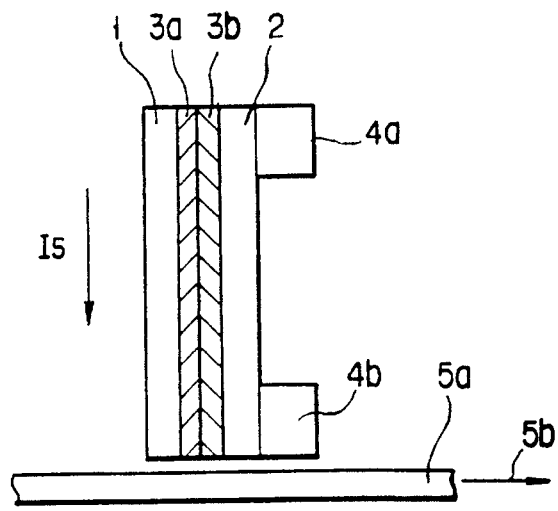
F I G. 2A
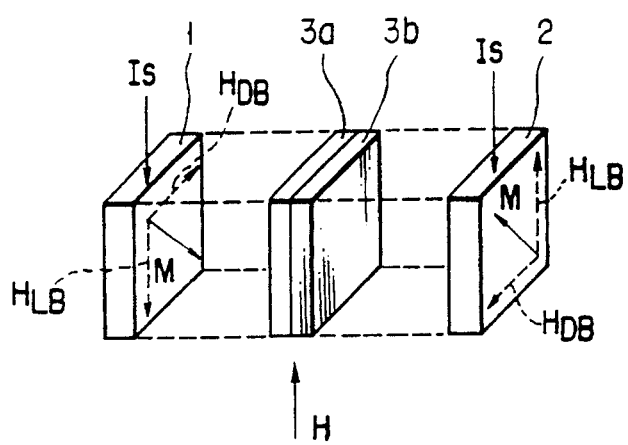
F I G. 2B
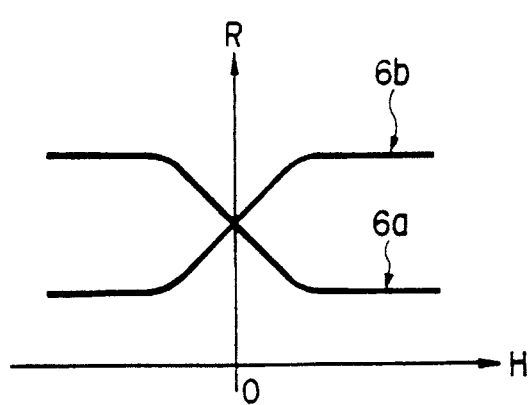
F I G. 2C   F I G. 3

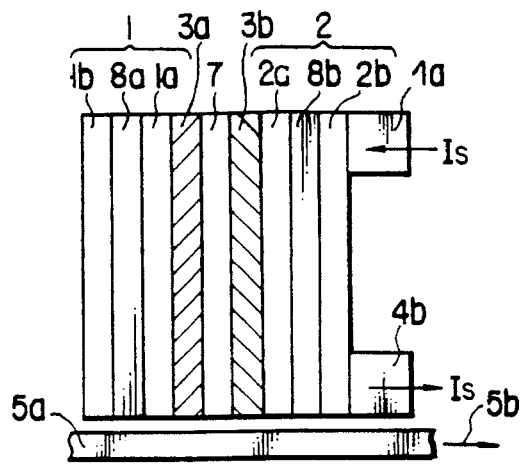
FIG. 6
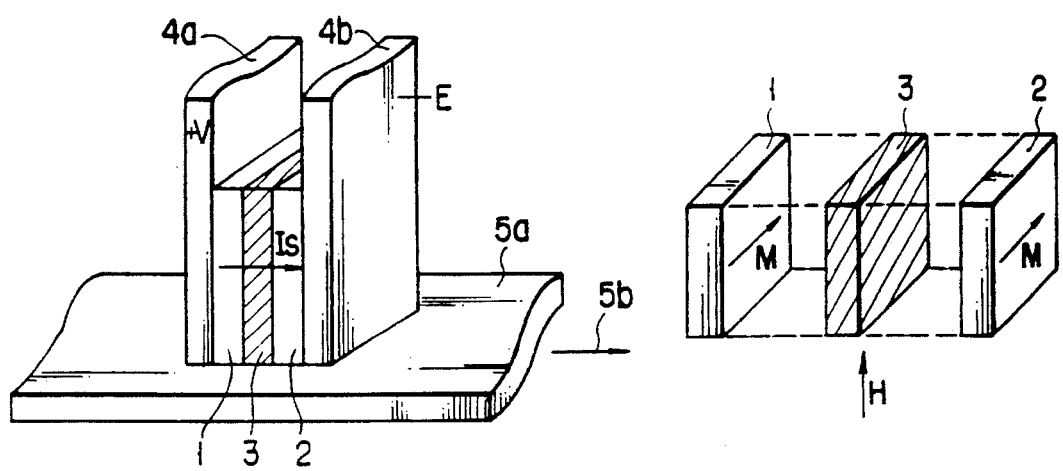
FIG. 7A
FIG. 7B
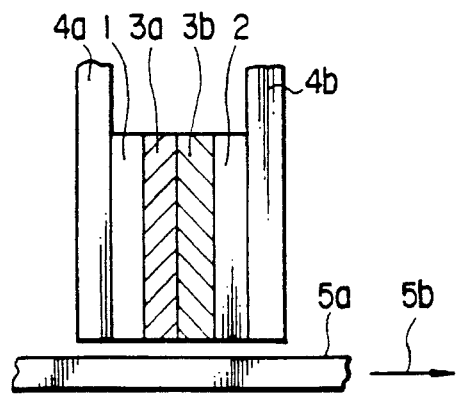
FIG. 8A
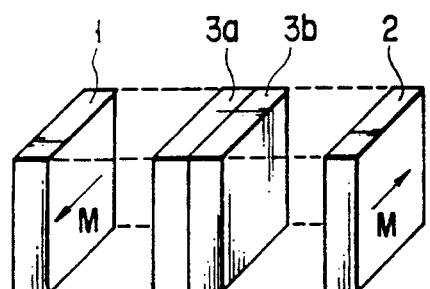
FIG. 8B

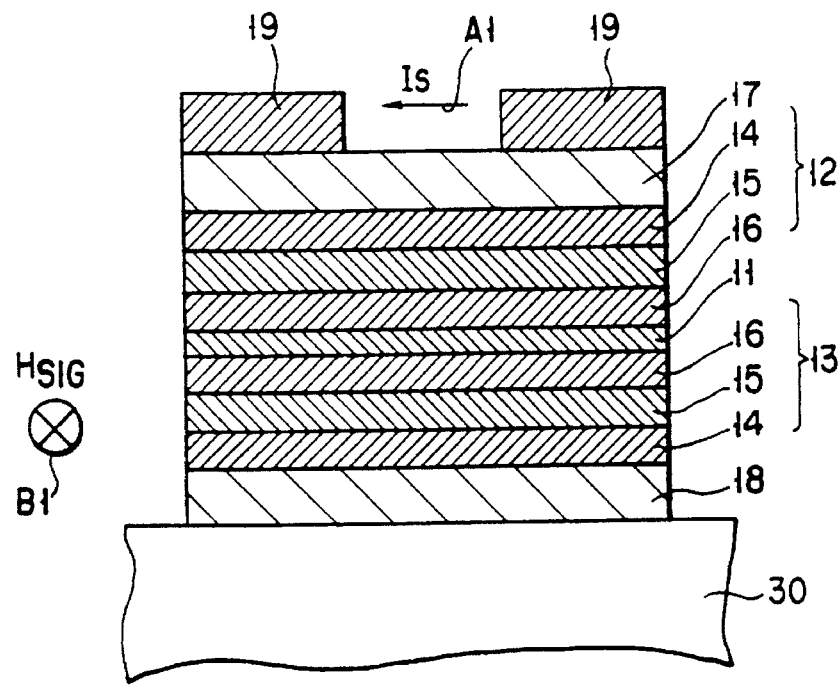
F I G. 9
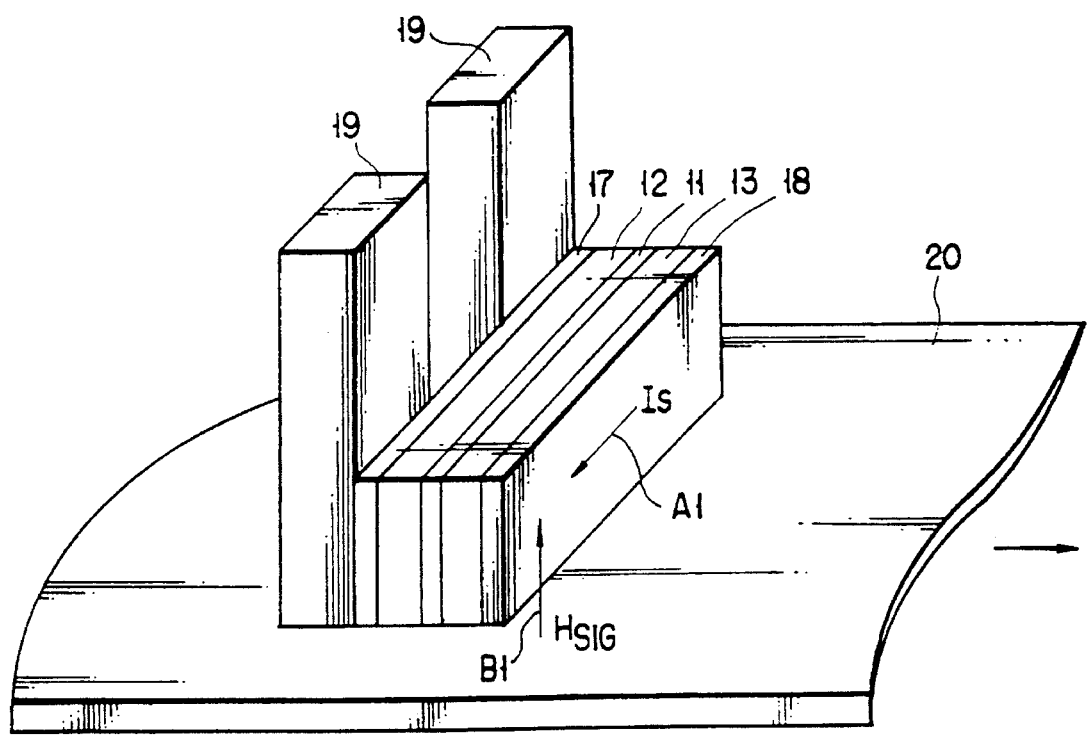
F I G. 10

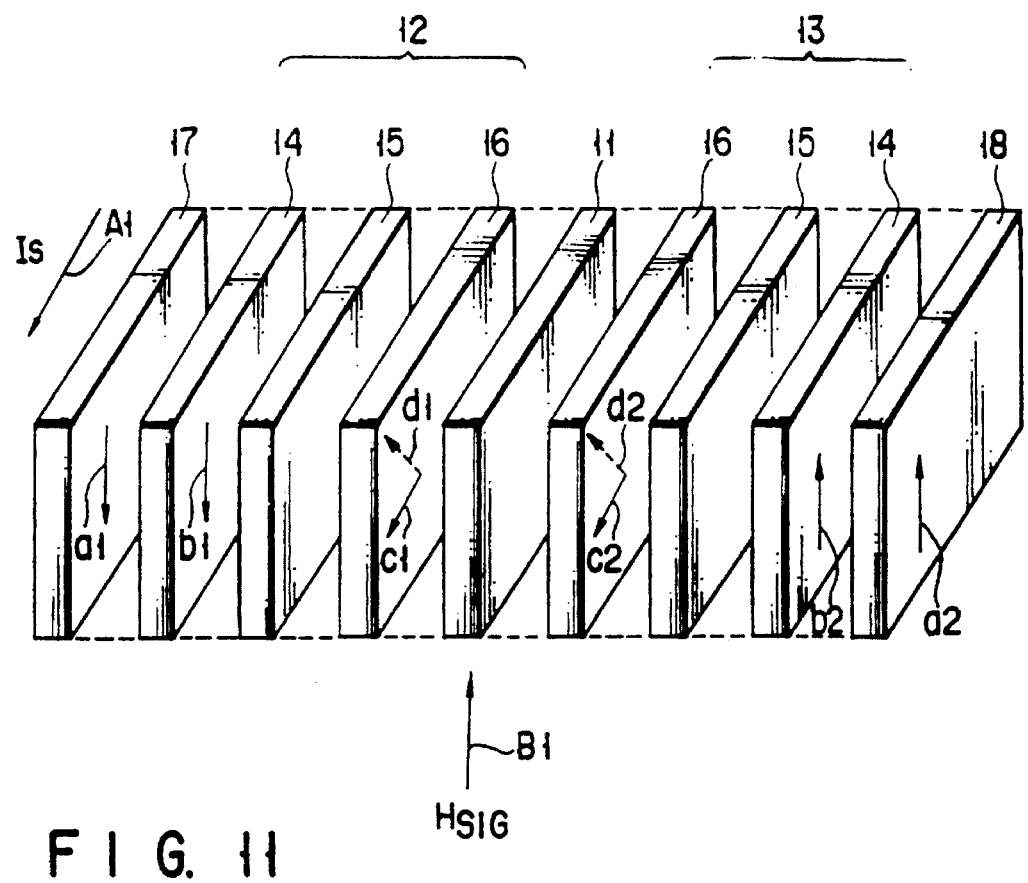
F I G. 11
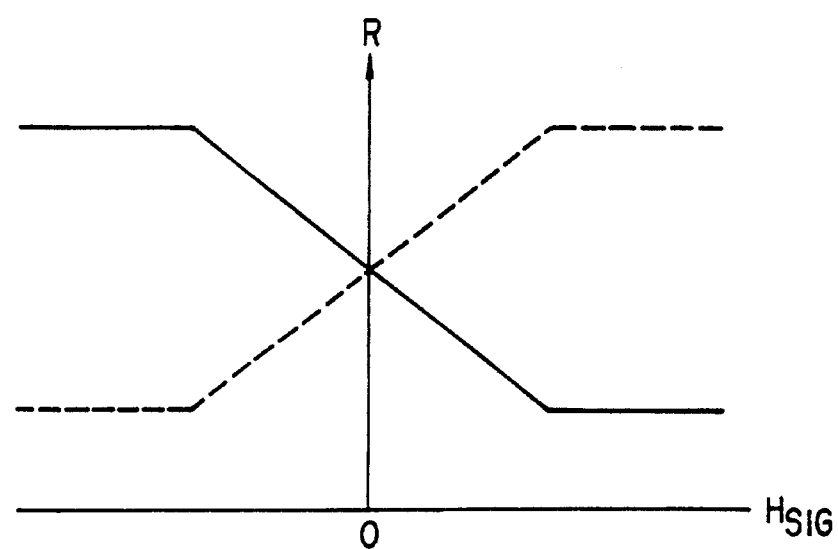
F I G. 12

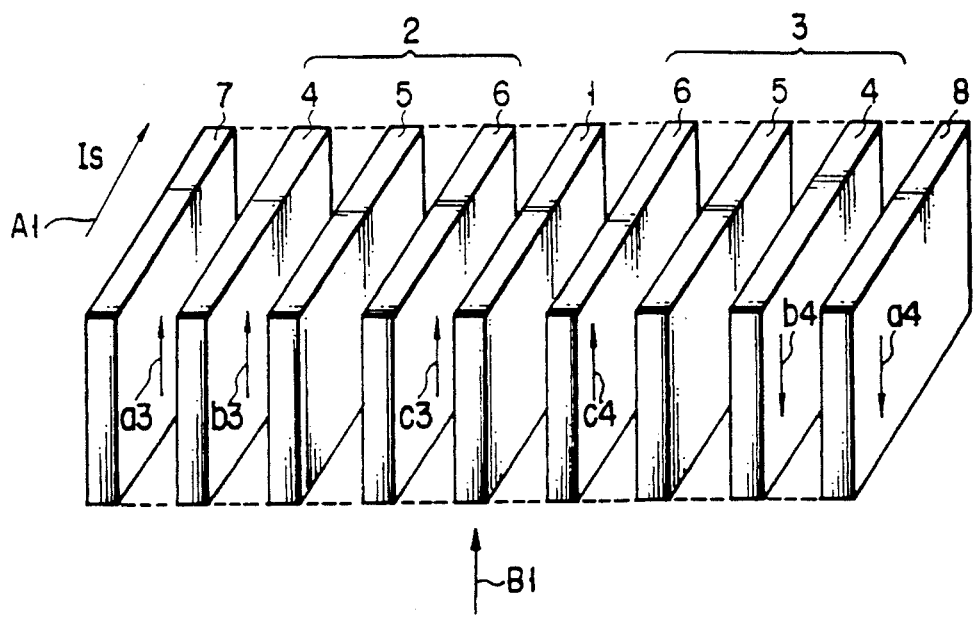
F I G. 13
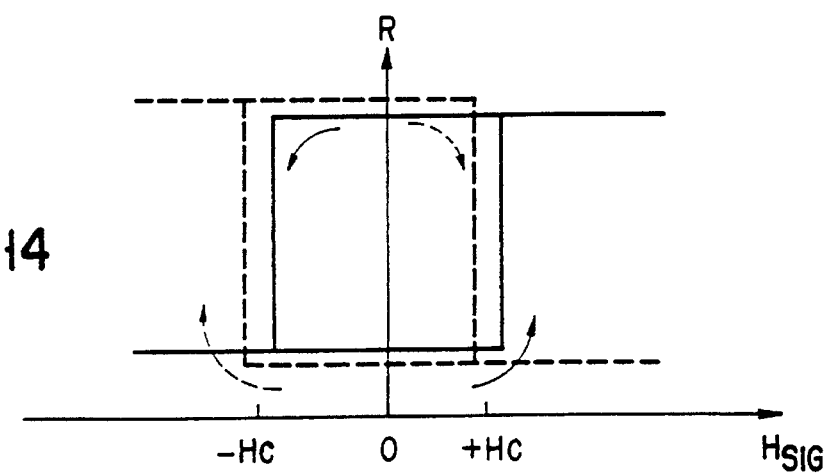
F I G. 14
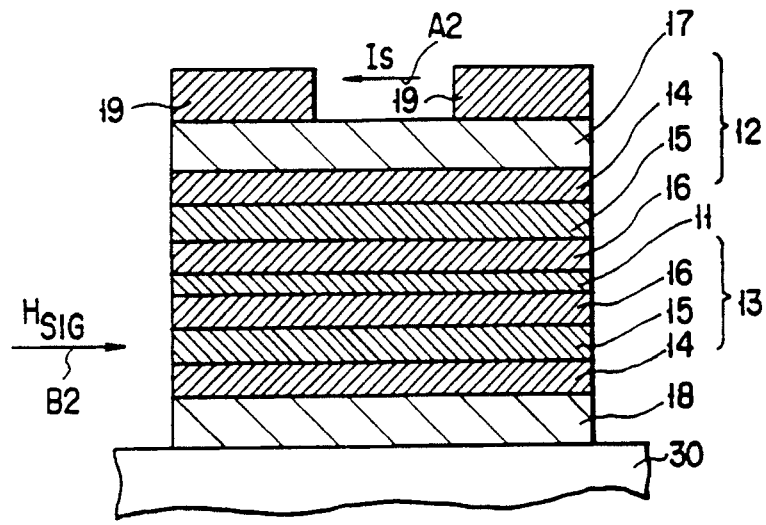
F I G. 15

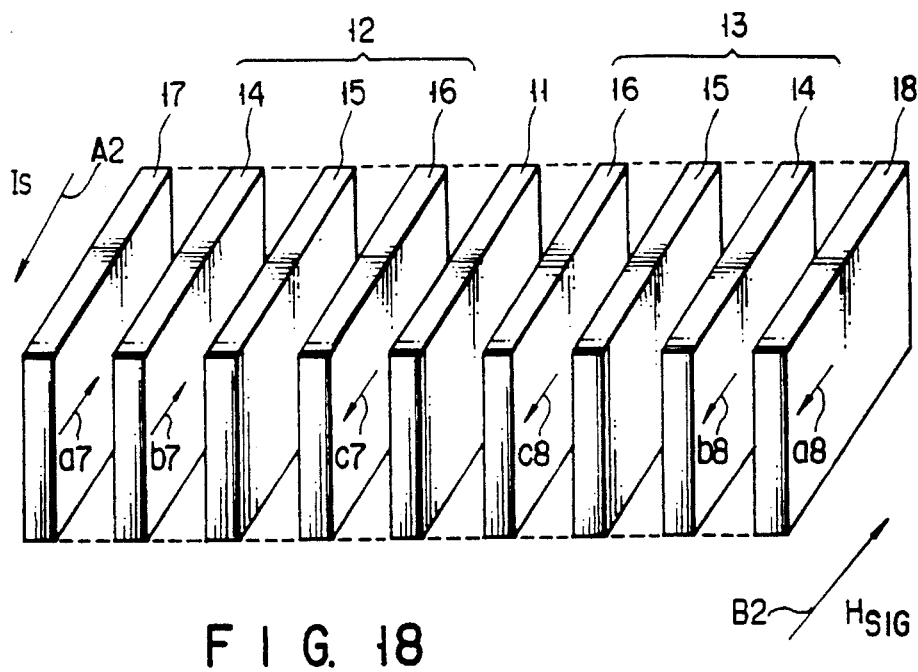
F I G. 18
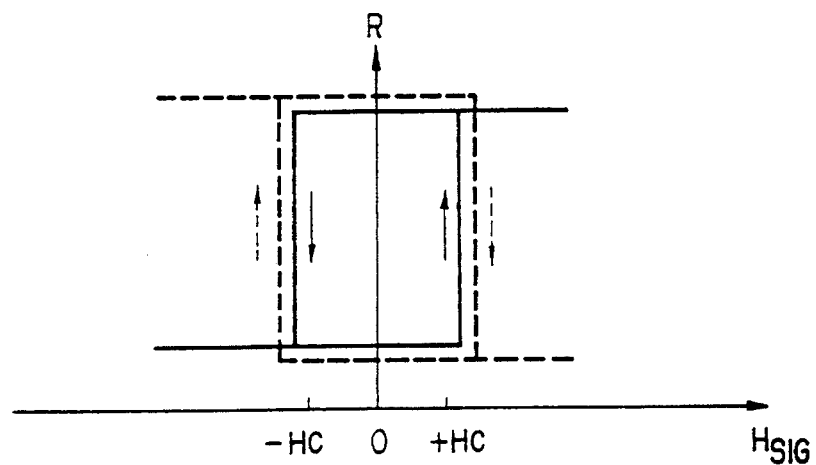
F I G. 19
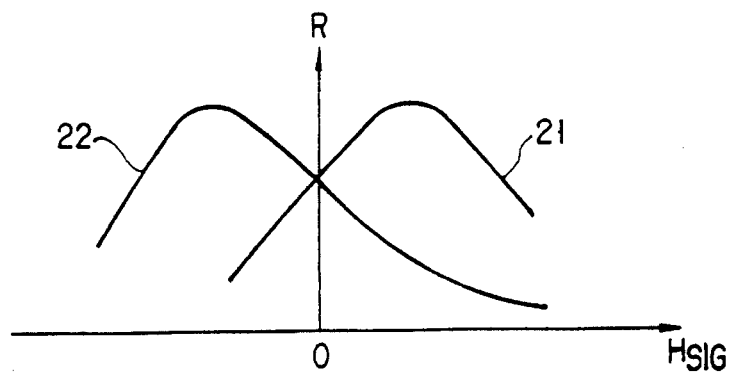
F I G. 22

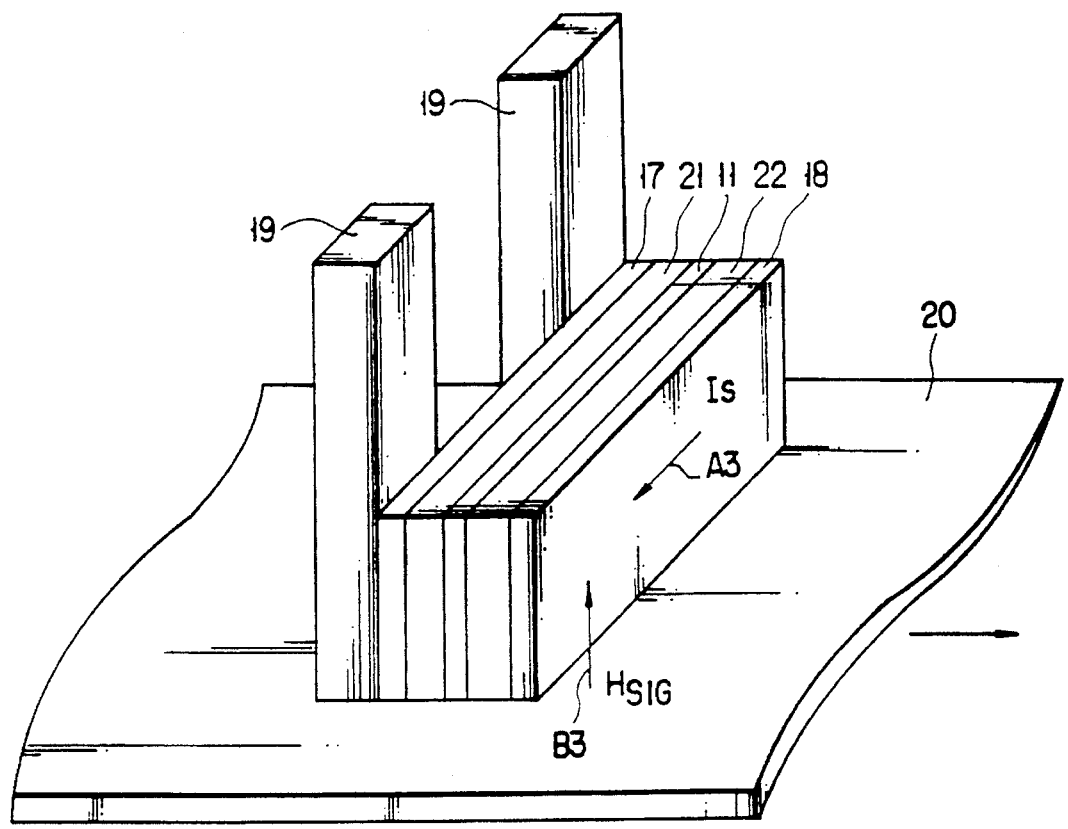
F I G. 20
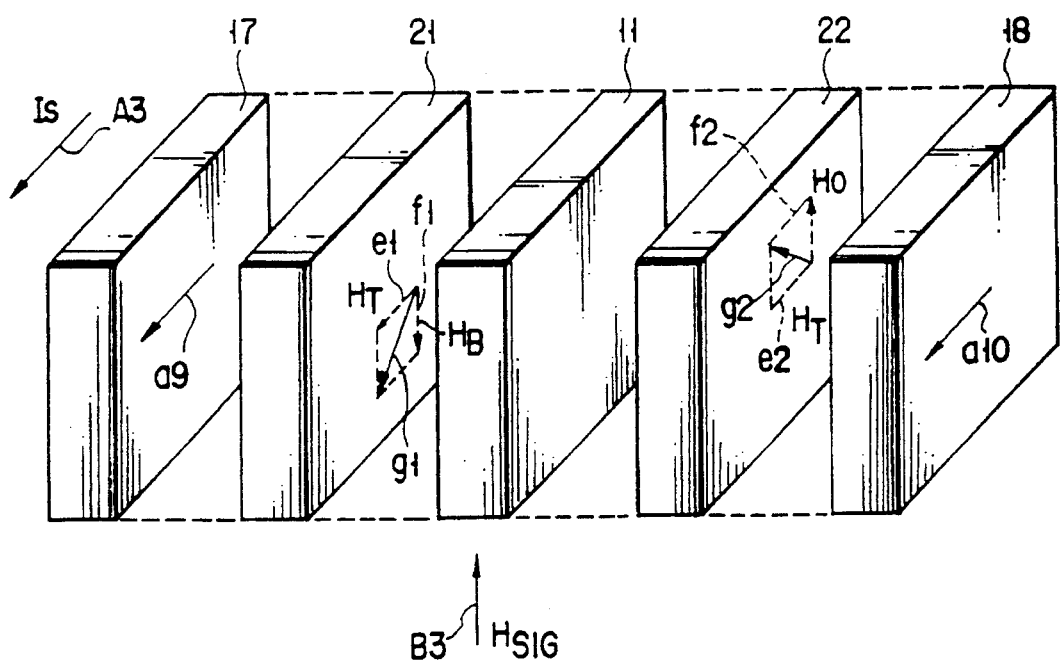
F I G. 21

5,576,915

MAGNETORESISTIVE HEAD WITH ANTIFERROMAGNETIC SUBLAYERS INTERPOSED BETWEEN FIRST AND SECOND SPIN-VALVE UNITS TO EXCHANGE BIAS INNER MAGNETIC FILMS THEREOF

This is a Division of application Ser. No. 08/212,865 filed on Mar. 15, 1994, now abandoned.

BACKGROUND OF THE INVENTION

1. Field of the Invention

This invention relates to a magnetoresistive head for use in a magnetic disk apparatus, video tape recorders (VTRs), or the like, and a magnetic write/read apparatus incorporating a magnetoresistive head. More particularly, the invention relates to a magnetoresistive head which generates little Barkhausen noise, which has high sensitivity and high linear recording resolution, and which can read signals of a high S/N ratio, and to a magnetic write/read apparatus which comprises this magnetoresistive head.

2. Description of the Related Art

A magnetoresistive head (hereinafter referred to as "MR head") is attracting much attention as a next-generation reading head to replace the conventional inductive magnetic head. Among the various types of MR heads hitherto known is a shield type MR head. The shield type MR head comprises an MR element, a shield layer having high magnetic permeability, and an insulating film interposed between the element and the shield layer. It is difficult to reduce the thickness of the insulating film to a value less than a particular one. Were the film too thin, sufficient insulation between the element and the shield layer could no longer be maintained. It is therefore hard to improve the linear recording resolution of the shield type MR head.

To solve this problem, a so-called dual-element type MR head has been developed as is disclosed in Jpn. Pat. Appln. KOKOKU Publication No. 53-37204. A dual-element type MR head has a multilayer structure; it comprises two anisotropy magnetoresistive (MR) elements and an intermediate layer interposed between the elements. The intermediate layer is either a nonmagnetic insulating layer or a nonmagnetic metal layer.

The MR elements apply operation-point biases of opposite polarities in a direction perpendicular to the plane of a magnetic recording medium when sense currents of the same polarity flow through both elements in a widthwise direction of the recording tracks of the medium. Therefore, the two MR elements change in resistance in the opposite directions when exposed to signal magnetic fields of the same polarity. The resistance change in one MR element cancels out the resistance change in the other MR element. As a result, the dual-element MR head generates no output. Conversely, when the elements are exposed to signal magnetic fields of the opposite polarities, their resistances change in the same polarity. In this case, the resistances of the MR elements strengthen each other, whereby the dual-element MR head generates an output.

As may be understood from the preceding paragraph, the dual-element MR head is a reading head which performs a so-called differential operation to generate signals. Since the thickness of the intermediate layer determines the linear recording resolution, this MR head need not have a shield layer, and is therefore simple in structure. The dual-element MR head can read signals of a high S/N ratio and have high linear recording resolution, as is known in the art.

However, no techniques have been devised which can apply an effective exchange bias field to the pair of MR elements, to thereby suppress Barkhausen noise, without compounding the structure of the dual-element MR head. The dual-element MR head has yet to be reduced to practice. Thus, there has been a demand for some means which would render the dual-element MR head practical.

Recently it has been found that a multilayer film, such as a spin-valve film, which comprises two magnetic films and a nonmagnetic film interposed between the magnetic films, exhibits large magnetoresistive far more sensitive than the anisotropy magnetoresistive conventionally attained. Research is being made for the possibility of incorporating MR elements with such an enormous magnetoresistance effect, into reading heads. Nevertheless, no MR reading head has ever known which can perform a differential operation with high reliability, to reproduce signals of a high S/N ratio at high linear recording resolution.

SUMMARY OF THE INVENTION

An object of the present invention is to provide an MR head which generates little Barkhausen noise, which has high sensitivity, high linear recording resolution and high reliability, which can read signals of a high S/N ratio, which can be manufactured easily, and which utilizes anisotropy magnetoresistance effect.

Another object of the invention is to provide a magnetic write/read apparatus which comprises this MR head.

Still another object of this invention is to provide an MR head which generates little Barkhausen noise, which has high sensitivity, high linear recording resolution and high reliability, which can read signals of a high S/N ratio, which is easy to manufacture, and which utilizes giant magnetoresistive technology.

Another object of the invention is to provide a magnetic write/read apparatus which comprises the MR head described in the preceding paragraph.

According to the present invention, there is provided a magnetoresistive head comprising:

a first anisotropic magnetoresistive film;

a second anisotropic magnetoresistive film; and an antiferromagnetic film interposed between the first and second anisotropic magnetoresistive films.

Also, according to the invention, there is provided a magnetoresistive head comprising:

a first magnetoresistive element formed of a pair of magnetic films and a nonmagnetic film interposed between the magnetic films;

a second magnetoresistive element formed of a pair of magnetic films and a nonmagnetic film interposed between the magnetic films; and an antiferromagnetic film interposed between the first and second magnetoresistive elements.

Further, according to a third aspect of the invention, there is provided a magnetoresistive head comprising:

a first magnetoresistive element;

a second magnetoresistive element;

a nonmagnetic intermediate film interposed between the first and second magnetoresistive elements;

a first exchange bias layer formed on a surface of the first magnetoresistive element, the surface facing away from the nonmagnetic intermediate film; and a second exchange bias layer formed on a surface of the second magnetoresistive element, the surface facing away from the nonmagnetic intermediate film.

Further, according to a fourth aspect of the invention, there is provided a magnetic write/read apparatus equipped with a recording magnetic head for recording an information in an insulating recording medium, and a magnetoresistive head for reading the information recorded in the recording medium, said magnetoresistive head comprising:

a first anisotropic magnetoresistive film;

a second anisotropic magnetoresistive film;

an antiferromagnetic layer interposed between the first and second anisotropic magnetoresistive films.

Further, according to a fourth aspect of the invention, there is provided a magnetic write/read apparatus equipped with a perpendicular magnetic recording head for recording an information in a Co-based alloy recording medium, and a magnetoresistive head for reading the information recorded in the recording medium, said magnetoresistive head comprising:

a first anisotropic magnetoresistive film;

a second anisotropic magnetoresistive film; and an antiferromagnetic layer interposed between the first and second anisotropic magnetoresistive films.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a perspective view showing an MR head according to a first embodiment of this invention;

FIG. 1B is an exploded perspective view of the head shown in FIG. 1A, indicating the directions in which the layers constituting the head are magnetized;

FIG. 1C is a diagram representing the relationship between the signal magnetic field of the head shown in FIG. 1A and the resistance of the head;

FIG. 2A is a side view showing an MR head according to a second embodiment of the present invention;

FIG. 2B is an exploded perspective view of the head shown in FIG. 2A, illustrating the directions in which the layers forming the head are magnetized;

FIG. 2C is a diagram illustrating the relationship between the signal magnetic field of the head shown in FIG. 2A and the resistance of the head;

FIG. 3 is a side view showing an MR head according to a third embodiment of the present invention;

FIG. 6 is a side view illustrating an MR head according to a sixth embodiment of the present invention;

FIG. 7A is a perspective view showing an MR head according to a seventh embodiment of this invention;

FIG. 7B is an exploded perspective view of the head shown in FIG. 7A, depicting the directions in which the layers constituting the head are magnetized;

FIG. 8A is a side view showing an MR head according to an eighth embodiment of this invention;

FIG. 8B is an exploded perspective view of the head shown in FIG. 8A, representing the directions in which the layers constituting the head are magnetized;

FIG. 9 is a sectional view showing an MR head according to a ninth embodiment of the present invention;

FIG. 10 is a perspective view showing the MR head shown in FIG. 9;

FIG. 11 is an exploded perspective view of the head shown in FIG. 9, showing the directions in which the layers constituting the head are magnetized;

FIG. 12 is a diagram representing the relationship between the signal magnetic field of the head shown in FIG. 9 and the resistance of the head;

FIG. 13 is an exploded perspective view of the MR head according to a tenth embodiment of the invention, illustrating the directions in which the layers forming this head are magnetized;

FIG. 14 is a diagram representing the relationship between the signal magnetic field of the head shown in FIG. 13 and the resistance of the head;

FIG. 15 is a sectional view showing an MR head according to an eleventh embodiment of the present invention;

FIG. 18 is an exploded perspective view of an MR head according to a twelfth embodiment of this invention, representing the directions in which the layers constituting the head are magnetized;

FIG. 19 is a diagram representing the relationship between the signal magnetic field of the head shown in FIG. 18 and the resistance of the head;

FIG. 20 is a perspective view showing an MR head according to a thirteenth embodiment of this invention;

FIG. 21 is an exploded perspective view of the head shown in FIG. 20, showing the directions in which the layers constituting the head are magnetized;

FIG. 22 is a diagram representing the relationship between the signal magnetic field of the head shown in FIG. 20 and the resistance of the head;

DETAILED DESCRIPTION OF THE PREFERRED EMBODIMENTS

Figure 4A:
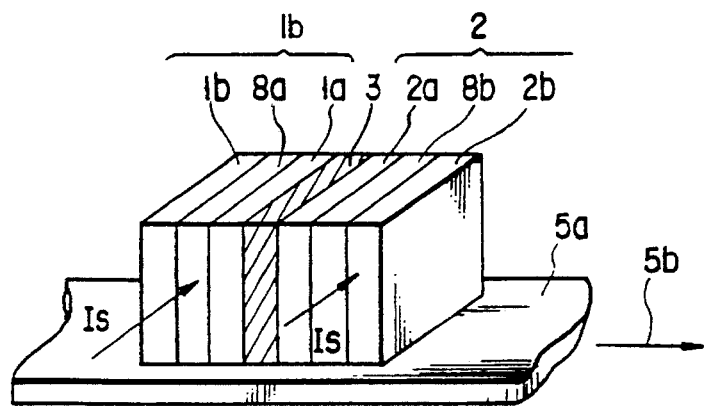
FIG. 4A is a perspective view showing an MR head according to a fourth embodiment of the present invention.

According to a first aspect of the present invention, there is provided an MR head which comprises a first MR element, a second MR element, and an antiferromagnetic film interposed between the first and second MR elements. Both MR elements can be formed of an anisotropy MR film. Alternatively, each MR element can be either a so-called spin-valve unit which comprises a pair of magnetic films and a nonmagnetic film sandwiched between the magnetic films, or an element, such as one formed of an artificial lattice film. These elements exhibit giant magnetoresistive.

The antiferromagnetic film may be made of FeMn alloy, Ni oxide, PdMn alloy, or the like. Preferably, the antiferromagnetic film is 2 to 10 nm thick. The MR element may be 5 to 10 nm thick in the case where each MR elements is formed of an anisotropic MR film, and 0.2 to 20 nm thick in the case where each MR elements is formed of a spin-valve film or an artificial lattice film.

The MR head according to the first aspect of the invention can assume one of the following alternative types:

(1) Both MR elements are anisotropic MR films. Sense currents are supplied through the MR elements, in a widthwise direction of the magnetized recording tracks of a magnetic recording medium. The antiferromagnetic film applies two bias magnetic fields of the same polarity or opposite polarities, onto the MR elements in a widthwise direction of the recording tracks of the medium.

(2) Both MR elements are anisotropy MR films. Sense currents are supplied through the MR elements, perpendicularly to the surface of a magnetic recording medium. First and second antiferromagnetic films are interposed between the MR elements, with or without a nonmagnetic film sandwiched between the antiferromagnetic films. The first antiferromagnetic film applies a first longitudinal bias magnetic field, i.e. exchange bias field in a direction perpendicular to the surface of the recording medium, onto the first MR element on the first antiferromagnetic film side. The second antiferromagnetic film applies a second longitudinal bias magnetic field of the opposite polarity to that of the first longitudinal bias magnetic field, in the same direction of that of the first longitudinal bias magnetic field, onto the second MR element. Even if the head had a single antiferromagnetic film, the longitudinal bias magnetic fields could be applied in the same manner.

(3) Both MR elements are spin-valve units, each comprising two magnetic films and a nonmagnetic film interposed between the magnetic film. Sense currents are supplied through the MR elements, in a widthwise direction of the magnetized recording tracks of a magnetic recording medium. The antiferromagnetic film applies bias magnetic fields of the same polarity or opposite polarities, onto those magnetic films of the MR elements which contact the antiferromagnetic film.

(4) Both MR elements are spin-valve units, each comprising two magnetic films and a nonmagnetic film interposed between the magnetic film. Sense currents are supplied through the MR elements, in a direction perpendicular to the surface of a magnetic recording medium. First and second antiferromagnetic films are interposed between the MR elements, with or without a nonmagnetic film sandwiched between the antiferromagnetic films. The first antiferromagnetic film applies a first longitudinal bias magnetic field in a direction perpendicular to the surface of the recording medium, onto that magnetic film of two magnetic films constituting the first MR element, which is in contact with the first an antiferromagnetic film. The second antiferromagnetic film applies a second longitudinal bias magnetic field of the opposite polarity to that of the first longitudinal bias magnetic field, in the same direction of that of the first longitudinal bias magnetic field, onto that magnetic film of two magnetic films constituting the second MR element, which is in contact with the second antiferromagnetic film. Even if the head had a single antiferromagnetic film, the longitudinal bias magnetic fields could be applied in the same way.

(5) The antiferromagnetic film is either an insulating film or a semiconductor film. A voltage is applied in a direction perpendicular to the surface of the films constituting the first and second MR elements, antiferromagnetic film. In this condition, when both MR elements receive a signal magnetic field from a magnetic recording medium, their electrical resistance changes. This change is detected in the form of a voltage change. Thus, the MR head read a signal from the recording medium.

As described above, the MR head according to the first aspect of the invention comprises a pair of MR elements and an antiferromagnetic film interposed between the MR elements. The antiferromagnetic film applies exchange bias magnetic fields i.e. longitudinal basis fields of the same polarity or opposite polarities onto the MR elements, in a widthwise direction of the track of a recording medium, and at the same time sense currents are supplied through the MR elements in the same direction, in a widthwise direction of the track of the medium. Alternatively, the antiferromagnetic film applies exchange bias magnetic fields of the same polarity or opposite polarities onto the MR elements, perpendicularly to the surface of the recording medium, and at the same time sense currents are supplied through the MR elements in the same direction, perpendicularly to the surface of the medium. Thus, when two signal magnetic fields of the same polarity are applied to the MR elements, the resistance changes in the MR elements cancel out each other. Conversely, when two signal magnetic fields of the opposite polarities are applied to the MR elements, the resistance changes in the MR elements strength each other. Namely, the MR head is of the type which performs a differential operation. The MR head does not generate Barkhausen noise, has high linear recording resolution and high sensitivity, and can read signals of a high S/N ratio from a magnetic recording medium.

In the first aspect of the present invention, a pair of MR elements located one upon the other, and an antiferromagnetic film is interposed between the MR elements. The MR elements are used as a reading head for detecting signal magnetic fields generated from the magnetized tracks of a recording medium. The antiferromagnetic film applies exchange bias magnetic fields of predetermined intensities in particular directions, onto the MR elements. The MR elements simultaneously become a single magnetic domain. Hence, the MR head generates but little Barkhausen noise.

Furthermore, when sense currents are supplied through both MR elements, in a widthwise direction of the recording tracks of a recording medium or in a direction perpendicular to the surface of the medium, two operation-point bias magnetic fields of the same polarity or opposite polarities are applied onto the MR elements, respectively, in a direction perpendicular to the surface of the recording medium or in a widthwise direction of the recording tracks thereof.

These operation-point bias magnetic fields, as well as the exchange bias magnetic fields of the same polarity or opposite polarities, are applied to the MR elements. The MR elements have their resistances changed in the opposite directions when they receive signal magnetic fields of the same polarity. As a result, the MR head generates no output voltage. On the other hand, when the MR elements receive signal magnetic fields of the opposite polarities, their resistances change in the same direction, whereby the MR head performs a differential operation to generate an output voltage.

Thus, the MR head does not respond to an uniform magnetic field applied externally. Therefore, its linear recording resolution can be determined merely by setting the thickness of the antiferromagnetic film and those of the MR elements at appropriate values—without the necessity of arranging highly permeable shield layers on both sides of each MR element.

As described above, in the MR head according to the first aspect of the present invention, the antiferromagnetic film enables the MR elements to simultaneously become a single magnetic domain. Also, by virtue of the antiferromagnetic film, the MR head performs a differential operation to generate an output voltage. In addition, the linear recording resolution of the MR head can De determined merely by setting the thickness of the antiferromagnetic film at a proper value.

According to a second aspect of the present invention, there is provided a MR head which comprises a first MR element, a second MR element, an nonmagnetic film interposed between the first and second MR elements, a first exchange bias layer formed on the outer surface of the first MR element, and a second exchange bias layer formed on the outer surface of the second MR element. Due to the exchange bias layers, those components of the magnetizing direction in the MR films, which are perpendicular to the surface of a recording medium, extend parallel to each other and in the opposite directions.

Each MR element of the head according to the second aspect of the invention may either be one which is formed of, for example, an anisotropic MR film. Alternatively, it may be one which is formed of a spin-valve film or an artificial lattice film and which has a great magnetoresistance effect.

The exchange bias layers incorporated in the MR head according to the second aspect of the invention are antiferromagnetic films made of FeMn, NiO, PdMn or the like if the MR elements are anisotropic MR films. They are similar antiferromagnetic films or Co-base or Fe oxide-based films having a large coercive force, in the case where the MR elements are spin-valve films or artificial lattice films.

It is desirable that the exchange bias layers be 2 to 100 nm thick. Preferably, the MR elements have a thickness of 5 to 50 nm if they are anisotropic MR films, and a thickness of 0.2 to 20 nm if they are either spin-valve films or artificial lattice films.

In the case where each MR element is a spin-valve film comprising two magnetic films and a nonmagnetic film interposed between the magnetic films, and if each exchange bias layer is a highly coercive film, the magnetic films (i.e., the outer films) of each MR element, which is in contact with the exchange bias layer, can be usually omitted. In this case, the magnetization of the highly coercive film itself is fixed. The nonmagnetic film (i.e., the intermediate film) of each MR element may be formed of TiN, AlN, Ti, V or the like, and is preferably 1.0 to 100 nm thick.

In the MR head according to the second aspect of this invention, each exchange bias layer formed on the outer surface of one first MR element applies to the MR element an exchange bias magnetic field which extends in a predetermined direction and which has a predetermined intensity. The MR elements can thereby become a single magnetic domain. Hence, the MR head does not generate Barkhausen noise. In other words, since the MR head has a simple structure, having only two exchange bias layers formed on the outer surfaces of the MR elements, respectively, it generates no Barkhausen noise.

Since the MR elements are separated by the nonmagnetic film interposed between them, they can operate independently of each other. Moreover, the exchange bias magnetic field and two operation-point bias magnetic fields of the same polarity or opposite polarities, generated from sense currents, magnetize the magnetic films (i.e., the outer films) of each MR element or the highly coercive films (used as the exchange bias layers), such that two components of a magnetizing direction, which are perpendicular to the surface of a recording medium, extend parallel to each other and in the opposite direction, more preferably not only parallel and in the opposite direction but also in the direction in which a signal magnetic field extend. Thus, if the signal magnetic fields, which are applied to the MR elements, are of the same polarity, the resistances of the MR elements change in the opposite directions, whereby the MR head produces no output voltage. Conversely, if the signal magnetic fields are of the opposite polarities, the resistances of the MR elements change in the same direction, whereby the MR head produces an output voltage. Namely, the head performs a differential operation to generate an output voltage. In addition, since the head does not generate Barkhausen noise, it has high linear recording resolution and high sensitivity and can reproduce signals of a high S/N ratio from a magnetic recording medium.

MR heads according to various embodiments of the present invention will be described with reference to the accompanying drawings. Of these embodiments, the first to eighth embodiments pertain to the first aspect of the invention, whereas the ninth to fourteenth embodiments pertain to the second aspect of this invention.

Embodiment 1

FIG. 1A shows an MR head according to the first embodiment of the invention. As shown in FIG. 1A, the MR head comprises a first anisotropic MR element 1 (thickness: 15 nm), a second MR element 2 (thickness: 15 nm), and an antiferromagnetic film 3 (thickness: 20 nm), interposed between the MR elements 1 and 2. Both anisotropic MR elements 1 and 2 are made of Permalloy, and the antiferromagnetic film 3 is made of FeMn, NiO or the like. Electrodes 4a and 4b are connected to the anisotropic MR elements 1 and 2, respectively. Through these electrodes 4a and 4b, sense currents $I_S$ are supplied to the elements 1 and 2, flowing in a widthwise direction of the tracks of a magnetic recording medium 5a.

The anisotropic MR elements 1 and 2 oppose the magnetic recording medium 5a which travels in the direction of an arrow 5b. When a signal magnetic field generated from the recording medium 5a is applied to the MR elements 1 and 2, the electrical resistances of the elements 1 and 2 change. As a result, the voltage between the ends of either MR element changes. The change in the voltage is detected, whereby a signal is reproduced from the magnetic recording medium 5a.

As shown in FIG. 1B, the antiferromagnetic film B applies two exchange bias magnetic fields $H_{LB}$ of the same polarity onto the MR elements 1 and 2, respectively, in a widthwise direction of the tracks of the medium 5a, within such an area that the magnetization M may be fully rotated by the signal magnetic field. The MR elements 1 and 2 thereby become a single magnetic domain. Therefore, the MR head does not generate Barkhausen noise.

Anisotropy in a widthwise direction of the tracks of the medium 5a can be imparted to the antiferromagnetic film 3 by two alternatively methods. In the first method, the film 3 is formed on either of the MR elements 1 and 2 in a magnetic field. In the second method, a structure comprised of the elements 1 and 2 and the film 3 interposed between the elements 1 and 2 is heated to a temperature above blocking temperature of the film 3. Whichever method is employed, rendering the film 3 anisotropic, exchange magnetic fields can be applied to the MR elements 1 and 2.

when sense currents $I_S$ are supplied to the elements 1 and 2, two operation-point bias magnetic fields $H_{DB}$ of the opposite polarities are applied to the anisotropic MR elements 1 and 2 in a direction perpendicular to the surface of the magnetic recording medium, as shown in FIG. 1B. The magnetization M in the elements 1 and 2 extend in the opposite directions. Hence, as shown in FIG. 1C, the resistances of the MR elements 1 and 2 decreases and increases, respectively, at around the time when the intensity H of the magnetic field is zero, as can be understood from the resistance curves 6a an 6b of the elements 1 an 2 (hereinafter referred to as "MR-response curves"). Thus, the MR head shown in FIG. 1A is one which performs a differential operation. As long as the anisotropic MR elements 1 and 2 receives signal magnetic fields of the same polarity from the magnetic recording medium 5a, the resistances of the elements 1 and 2 cancel out each other, and the MR head does not generate an output voltage.

When the anisotropic MR elements 1 and 2 detect signal magnetic fields of the opposite polarities generated from the magnetic recording medium 5a, their resistances acquire the same polarity and strengthen each other. The MR head thus generates an output voltage. Thus, the head can read signals from the medium 5a with high linear recording resolution, without using highly permeable shield layers spaced apart from both sides of each MR element. To attain a sufficient linear recording resolution it suffices to change the thicknesses of both either MR elements 1 and 2 and also the the thickness of the antiferromagnetic film 3.

As indicated above, the MR head according of the first embodiment of the invention is characterized not only in that the single antiferromagnetic film interposed between the two MR elements applies exchange biases to the MR elements, making them behave as a single magnetic domain, but also in that a sufficient linear recording resolution can be attained by changing the thickness of the antiferromagnetic film to a desired value. The MR head is quite simple in structure and easy to manufacture, and can be produced with high yield.

Embodiment 2

FIG. 2A shows an MR head according to the second embodiment of the present invention. As shown in FIG. 2A, this head comprises a first anisotropic MR element 1 (thickness: 10 nm), a second anisotropic MR element 2 (thickness: 10 nm), a first antiferromagnetic film 3a (thickness: 15 nm), and a second antiferromagnetic film 3b (thickness: 15 nm). The antiferromagnetic films 3a and 3b are interposed between the elements 1 and 2, and have different blocking temperatures. Two electrodes 4a and 4b are formed on the second MR element 2. More precisely, the electrode 4b is placed on the lower end of the element 2 which, faces a magnetic recording medium 5a, and the electrode 4a is attached to the upper end of the element 2 and thus spaced apart from the electrode 4b.

In operation, senses currents are supplied to the anisotropic MR elements 1 and 2 through the electrodes 4a and 4b, flowing perpendicularly to the surface of the recording medium 5a. As the medium 5a runs in the direction of an arrow 5b, the MR elements 1 and 2 detect signal magnetic fields generated from the medium 5a. The electrical resistances of the elements 1 and 2 therefore change. The change in resistance is detected as a voltage change. Thus, the MR head read a signal from the magnetic recording medium 5a.

As shown in FIG. 2B, the first antiferromagnetic film 3a applies to the first MR element 1 an exchange bias field $H_{LB}$ which extends perpendicularly to the surface of the medium 5a, while the second antiferromagnetic film 3b applies to the second MR element 2 an exchange bias field $H_{LB}$ which is of the polarity opposite to that of the field $H_{LB}$ applied to the first MR element 1 and which extends in the same direction as the field $H_{LB}$ applied to the first MR element 1. Furthermore, two operation-point bias magnetic fields $H_{DB}$ of the opposite polarities, generated from the sense currents $I_S$, are applied to the MR elements 1 and 2, respectively, in the same direction.

Thus, as shown in FIG. 2B, the magnetization M in the MR elements 1 and 2 extend at a predetermined angle to a line normal to the tracks of the recording medium 5a unless any external magnetic field is applied to the MR head. Therefore, when signal magnetic fields of the same polarity are applied from the medium 5a to the MR elements 1 and 2, the resistances of the elements 1 and 2 decreases and increases, respectively, around H of zero, as can be understood from the MR-response curves 6a an 6b of the elements 1 an 2 illustrated in FIG. 2C. As a result of this, the MR head performs a differential operation in the same way as the first embodiment (FIG. 1A), and accomplish the same advantage as the first embodiment.

To apply exchange bias magnetic fields of the opposite polarities to the first MR element 1 and the second MR element 2, respectively, it suffices to apply a magnetic field in a predetermined direction onto the elements 1 and 2 while heating both elements at a temperature higher than $T_1$, and then to a magnetic field of the opposite polarity in the same direction onto the elements 1 and 2 while heating both elements at a temperature lower than $T_1$ and higher than $T_2$, where $T_1$ and $T_2$ are the blocking temperatures of the antiferromagnetic films 3a and 3b, respectively, and $T_1 > T_2$.

The antiferromagnetic films 3a an 3b may be replaced by a single antiferromagnetic layer, which may be formed in the following method. A homogeneous antiferromagnetic layer is formed, first, in a magnetic filed having a particular intensity to a predetermined thickness (e.g., 10 nm) and then, in a magnetic field of the opposite polarity. The antiferromagnetic layer thus formed functions as if it comprised of two antiferromagnetic films, to two exchange bias magnetic fields to the MR elements 1 and 2, respectively.

Embodiment 3

FIG. 3 illustrates an MR head according to the second embodiment of the present invention. As may be seen from in FIG. 3, the MR head is a modification of the second embodiment (FIG. 2A). As shown in FIG. 3, the head differs from the second embodiment in that a nonmagnetic film 7 (thickness: 10 nm) made of AlN or the like is interposed between the first antiferromagnetic film 3a (thickness: 10 nm) and the second antiferromagnetic film 3b (thickness: 10 nm). The films 3a, 7 and 3b are formed one upon another, for example in the order mentioned. To state more specifically, the first antiferromagnetic film 3a is formed in a prescribed magnetic field applied in a specific direction. The film 3a thereby attains anisotropy of that direction. Next, the nonmagnetic film 7 is formed on the first antiferromagnetic film 3a. Then, the second antiferromagnetic film 3b is formed in a magnetic field which is applied in the same direction as the magnetic field applied to form the film 3a and which is opposite in polarity to the magnetic field applied to form the film 3a. An exchange bias magnetic field is generated at the interface between the nonmagnetic film 7 and the second antiferromagnetic film 3b. Due to this exchange bias magnetic field, the second antiferromagnetic film 3a attains anisotropy which is identical in direction and opposite in polarity to the anisotropy of the first antiferromagnetic film 3a. Hence, two exchange bias magnetic fields are applied onto the pair of MR elements 1 and 2 in the same way as in the second embodiment. The MR head according to the third embodiment achieves the same advantage as the second embodiment.

Embodiment 4

FIG. 4A shows an MR head according to the fourth embodiment of the present invention. As illustrated in FIG. 4A, this MR head comprises two MR elements 1 and 2 and an antiferromagnetic layer 3 interposed between the elements 1 and 2. The first MR element 1 is a spin-valve unit formed of a magnetic film 1a (thickness: 5 nm), a nonmagnetic metal film 8a (thickness: 2.5 nm) and a magnetic film 1b (thickness: 5 nm). Similarly, the second MR element 2 is a spin-valve unit formed of a magnetic film 2a (thickness: 5 nm), a nonmagnetic metal film 8b (thickness: 2.5 nm) and a magnetic film 2b (thickness: 5 nm). The magnetic films 1a, 1b, 2a and 2b are made of CoFe, NiFe or the like, whereas the nonmagnetic metal films 8a and 8b are made of Cu or the like.

Both MR elements 1 and 2 exhibit a giant magnetoresistive effect such as spin-valve phenomenon, and are more sensitive to magnetic fields than any conventional anisotropic MR elements. The antiferromagnetic layer 3 interposed between the MR elements 1 and 2 is made of FeMn, NiO or the like.

When sense currents $I_S$ are supplied to the MR elements 1 and 2, in a widthwise direction of the tracks of a magnetic recording medium 5a, the elements 1 and 2 detect signal magnetic fields generated from the recording medium 5a. The electrical resistances of the elements 1 and 2 therefore change, changing the voltage between the ends of each MR element. The voltage changes of the elements 1 and 2 are detected, whereby the MR head reads a signal from the magnetic recording medium 5a.

Figure 4B:
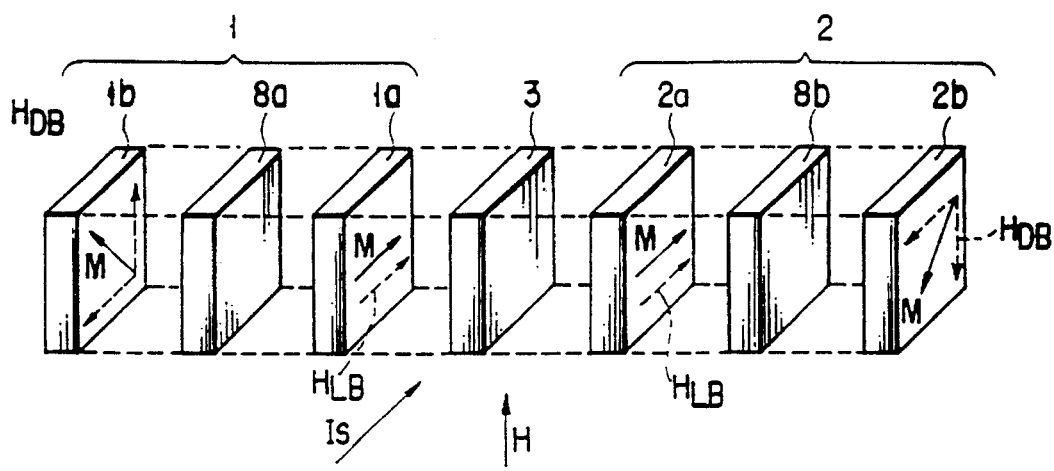
FIG. 4B is an exploded perspective view of the head shown in FIG. 4A, representing the directions in which the layers constituting the head are magnetized.

As shown in FIG. 4B, the antiferromagnetic layer 3 applies two exchange bias magnetic fields $H_{LB}$ in a widthwise direction of the tracks of the recording medium 5a, onto the magnetic films 1a and 2a of the MR elements, respectively, which face the antiferromagnetic layer 3. These magnetic fields $H_{LB}$ are so intense as not to rotate or be reversed even when they receive signal magnetic fields from the medium 5a. Meanwhile, two operation-point bias magnetic fields $H_{DB}$ of the opposite polarities, generated by the sense currents $I_S$, are applied in a direction perpendicular to the surface of the medium 5a, onto the magnetic films 1b and 2b of the MR-elements, respectively, which are spaced far from the antiferromagnetic layer 3.

Figure 4C:
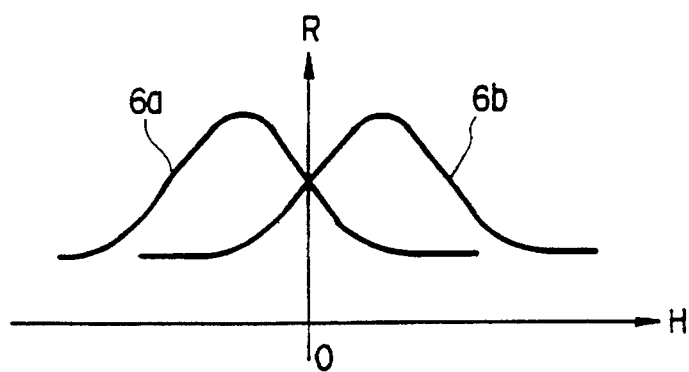
FIG. 4C is a diagram representing the relationship between the signal magnetic field of the head shown in FIG. 4A and the resistance of the head.

As a result, the magnetization M in the magnetic films 1b and 2b extend at a predetermined angle to a line normal to the tracks of the recording medium 5a and are of the opposite polarities, as is illustrated in FIG. 4B. The MR head therefore performs a differential operation as shown in FIG. 4C, in the same way as the embodiments described above.

Embodiment 5

Figure 5A:
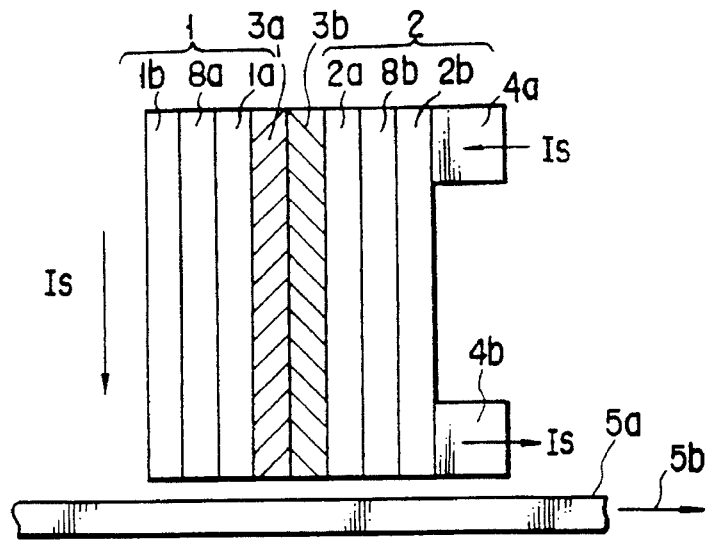
FIG. 5A is a perspective view showing an MR head according to a fifth embodiment of the present invention.

FIG. 5A shows an MR head according to the fifth embodiment of the present invention. As shown in FIG. 5A, the MR head comprises a pair of MR elements 1 and 2 and an antiferromagnetic layer interposed between the MR elements 1 and 2. The MR elements 1 and 2 are of the same type as those of the fourth embodiment (FIG. 4A) and used to detect signal magnetic fields generated from a recording medium 5a. The antiferromagnetic layer is formed as a pair of antiferromagnetic films 3a and 3b, laid one upon the other. Two electrodes 4a and 4b are formed on the second MR element 2. More precisely, the electrode 4b is placed on the lower end of the element 2 which faces a magnetic recording medium 5a, and the electrode 4a is attached to the upper end of the element 2 and thus spaced apart from the electrode 4b.

In operation, sense currents are supplied to the spin-valve MR elements 1 and 1 through the electrodes 4a and 4b, flowing perpendicularly to the surface of the recording medium 5a. As the medium 5a runs in the direction of an arrow 5b, the MR elements 1 and 2 detect signal magnetic fields generated from the medium 5a. The electrical resistances of the elements 1 and 2 therefore change. The change in resistance is detected as a voltage change. Thus, the MR head reads a signal from the magnetic recording medium 5a.

Figure 5B:
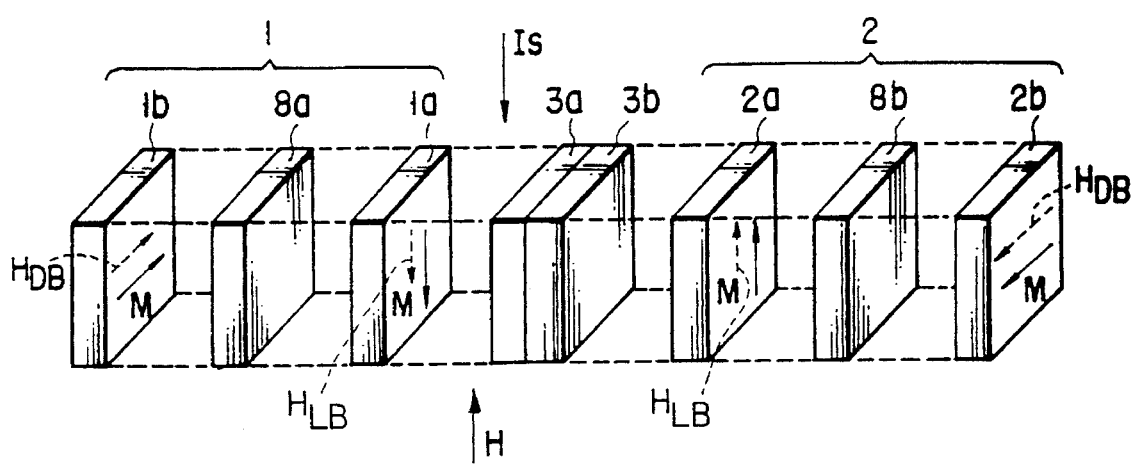
FIG. 5B is an exploded perspective view of the head shown in FIG. 5A, indicating the directions in which the layers constituting the head are magnetized.

As shown in FIG. 5B, the antiferromagnetic films 3a and 3b apply two exchange bias magnetic fields $H_{LB}$ of the opposite polarities, perpendicularly to the surface of the medium 5a, onto the magnetic films 1a, 2a of the MR elements 1 and 2, respectively, which face the antiferromagnetic films 3a and 3b. The magnetic field $H_{LB}$ are so intense as not to rotate even when they receive signal magnetic fields from the medium In the meantime, two operation-point bias magnetic fields $H_{DB}$ of the opposite polarities, generated by the sense currents $I_S$, are applied in a direction normal to the tracks of the medium 5a, onto the magnetic films 1b and 2b of the MR elements, respectively, which are spaced far from the antiferromagnetic films 3a and 3b.

Figure 5C:
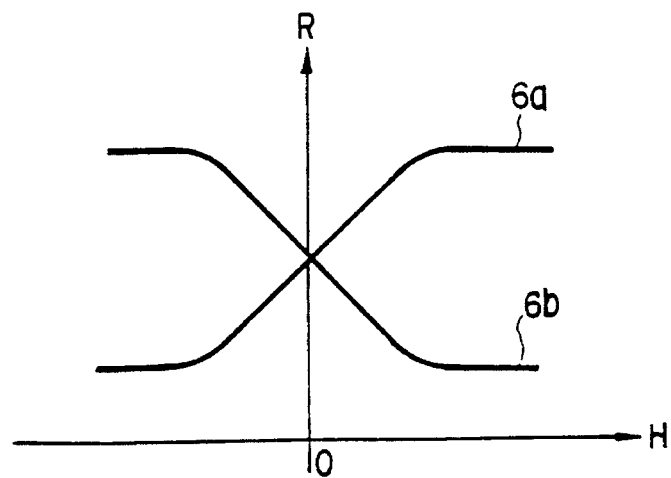
FIG. 5C is a diagram representing the relationship between the signal magnetic field of the head shown in FIG. 5A and the resistance of the head.

Thus, as shown in FIG. 5B, the magnetization M in the magnetic films 1b and 2b extend, each in the same direction as the operation-point bias magnetic field $H_{DB}$ applied to it. Therefore, when the magnetic films 1b and 2b detect two signal magnetic fields generated from the the medium 5a, the resistances of the MR elements 1 and 2, decreases and increases, respectively, around H of zero, as can be understood from the MR-response curves 6a an 6b of the elements 1 an 2 illustrated in FIG. 5C. As a result of this, the MR head performs a differential operation in the same way, and attains the same advantage, as the embodiments described above.

Embodiment 6

FIG. 6 shows an MR head according to the sixth embodiment of this invention. As shown in FIG. 6, the MR head is a modification of the head according to the fifth embodiment (FIG. 5A). The head is different in that a nonmagnetic film 7 made of AlN or the like is interposed between the first antiferromagnetic film 3a and the second antiferromagnetic film 3b. The films 3a, 7 and 3b are formed one upon another. More specifically, as in the third embodiment (FIG. 3), the first antiferromagnetic film 3a is formed in a prescribed magnetic field applied in a particular direction, thereby attaining anisotropy of that direction. Next, the nonmagnetic film 7 is formed on the first antiferromagnetic film 3a. Then, the second antiferromagnetic film 3b is formed in a magnetic field which is applied in the same direction as the magnetic field applied to form the film 3a and which is opposite in polarity to the magnetic field applied to form the film 3a. As a result, the second antiferromagnetic film 3b attains anisotropy which is identical in direction and opposite in polarity to the anisotropy of the first antiferromagnetic film 3a. Hence, two exchange bias magnetic fields are applied onto the pair of MR elements 1 and 2 in the same way as in the fifth embodiment (FIG. 5A). The MR head according to the sixth embodiment accomplishes the same advantage as the fifth embodiment.

Embodiment 7

FIG. 7A shows an MR head according to the seventh embodiment of the present invention. This head comprises a first magnetic film 1, a second magnetic film 2, and an antiferromagnetic layer 3. The layer 3 is made of NiO or the like and interposed between the magnetic films 1 and 2. An electrode 4a is connected to the outer side of the first magnetic film 1, and an electrode 4b to the outer side of the second magnetic film 2.

In operation, a voltage is applied between the electrodes 4a and 4b. Then a tunnel current flows through the antiferromagnetic layer 3. When the magnetic films 1 and 2 receive signal magnetic fields from a magnetic recording medium 5a, the angle defined by the magnetic fluxes in the films 1 and 2 changes. The conductances of the films 1 and 2 therefore change The conductance changes are detected in the form of voltage changes, whereby the MR head reads a signal from the magnetic recording medium 5a.

As shown in FIG. 7B, the antiferromagnetic layer 3 applies exchange bias magnetic fields to the magnetic films 1 and 2. The exchange bias magnetic fields are so intense that the magnetization M in the films 1 and 2 are rotated by signal magnetic fields generated from the medium 5a. Therefore, when the first magnetic film 1 and the second magnetic film 2 receive signal magnetic fields which are identical in intensity and polarity, the MR head generates no output voltage. Conversely, when the films 1 and 2 receive signal magnetic fields which are identical in intensity and different in polarity, the MR head generates a maximum output voltage. Namely, the MR head according to the seventh embodiment performs a differential operation in the same way, and accomplish the same advantage, as the embodiments described above.

Embodiment 8

FIG. 8A shows an MR head according to the eighth embodiment of the present invention. As can be understood from FIG. 8A, the MR head is identical to the seventh embodiment shown in FIG. 7A, except for two points. First, two antiferromagnetic films 3a and 3b having different blocking temperatures are interposed between the first magnetic film 1 and the second magnetic film 2. Second, the antiferromagnetic films 3a and 3b apply two exchange bias magnetic fields of the opposite polarities to the magnetic films 1 and 2, respectively, in a widthwise direction of the tracks of a magnetic recording medium.

MR head according to the eighth embodiment operates in the same way, and achieves the same advantage, the seventh embodiment shown in FIG. 7A.

As described above, according to the first aspect of the invention there can be provided an MR head which is characterized in two respects. First, the head comprises a pair of MR elements and at least one antiferromagnetic film interposed between the MR elements. Second, the antiferromagnetic film applies two exchange bias magnetic fields of the same or opposite polarities to the MR elements, respectively, in a widthwise direction of the tracks of a magnetic recording medium, and sense currents are supplied to the MR elements in the same direction, in a widthwise direction of the tracks of the recording medium; alternatively, the antiferromagnetic film applies two exchange bias magnetic fields of the same or opposite polarities to the MR elements, respectively, in a direction perpendicular to the surface of the recording medium, and sense currents are supplied to the MR elements in the same direction, in a direction perpendicular to the surface of the recording medium Hence, the resistance changes in the MR elements cancels out each other when the MR elements receive signal magnetic fields of the same polarity, and strengthen each other when the MR elements receive signal magnetic fields of the opposite polarities.

The MR head does not generate Barkhausen noise. Moreover, it has high linear recording resolution and high sensitivity and can read signals of a high S/N ratio from a magnetic recording medium. In addition, the MR head simple in structure and easy to manufacture, and can be produced with high yield. Still further, the MR head may include elements exhibiting giant magnetoresistive, such as spin-valve units. If incorporating such elements, the MR head will read signals with higher sensitivity and at higher S/N ratio than MR head using conventional anisotropic MR elements.

The ninth to fourteenth embodiments, which pertain to the second aspect of this invention, will now be described.

Embodiment 9

An MR head according to the ninth embodiment of the present invention will be described, with reference to FIGS. 9 to 12. FIG. 9 is a sectional view illustrating the structure of the head. FIG. 10 is a perspective view, representing the positional relationship of the head and a magnetic recording medium.

As shown in FIGS. 9 and 10, the MR head comprises an intermediate nonmagnetic film 11 made of TiN and two spin-valve units 12 and 13 sandwiching the film 11 and used as a pair of MR elements. Each spin-valve unit is formed of a pair of magnetic films 14 and 16 and a nonmagnetic film 15 interposed between the magnetic films 14 and 16. The magnetic films 14 and 16 are made of $Co_{90}Fe_{10}$, and the nonmagnetic film 15 is made of Cu. The structure of the MR head is not limited to the one shown in FIG. 9. Rather, the head may have some other three-layer structures, such as Co/Cu/Co structure, Co/Ru/Co structure, Fe/Cr/Fe structure, NiFe/Cu/NiFe structure, and NiFe/Ag/NiFe structure.

An antiferromagnetic film 17 of $Fe_{50}Mn_{50}$, used as an exchange bias layer, is formed on the outer surface of the magnetic film 14 of the first spin-valve unit 12. Similarly, an antiferromagnetic film 18 of $Fe_{50}Mn_{50}$, used as an exchange bias layer, is formed on the outer surface of the magnetic film 14 of the second spin-valve unit 13. Leads 19 are connected to the antiferromagnetic film 17. Thus, the components 11, 12, 13, 17, 18 and 19 constitute the MR head according to the ninth embodiment of the present invention.

The MR head has been produced by forming, on a substrate 50, the antiferromagnetic film 18 (thickness: 15 nm), the magnetic film 14 (thickness: 5 nm), the nonmagnetic film 15 (thickness: 2 nm), the magnetic film 16 (thickness: 5 nm), the intermediate nonmagnetic film 11 (thickness: 30 nm) the magnetic film 16 (thickness: 5 nm), the nonmagnetic film 15 (thickness: 2 nm), the magnetic film 14 (thickness 5 nm) and the antiferromagnetic film 17 (thickness: 15 nm)—one upon another, in the order mentioned. These films may be formed by means of ion-beam sputtering, vapor deposition, or the like. As is seen from FIG. 10, the MR head has shape anisotropy, extending longer along the track width of a magnetic recording medium 20 than along the signal magnetic field generated from the medium 20. The structure formed of the films 11 to 18 can, therefore, be patterned by ordinary process comprising various steps such as resist coating, exposure, development and ion-milling. To prevent the structure from being corroded during the patterning process, it would be desirable that a protective layer be formed on the uppermost film of the structure, i.e., the antiferromagnetic film 17.

In operation, sense currents $I_S$ are supplied to the MR head, flowing in the direction of an arrow namely in a widthwise direction off the tracks of the recording medium 20. Signal magnetic fields are applied from the medium 20 along in the direction of an arrow $B_1$, namely in a direction parallel to the interfaces among the films of the MR head and perpendicular to the sense currents $I_S$.

The directions in which the films of the MR head are magnetized will be explained, with reference to FIG. 11 which is an exploded perspective view of the MR head. As indicated above, the sense currents $I_S$ flow through the MR head, in a widthwise direction of the tracks of the magnetic recording medium 20. Thus, magnetic anisotropies $a_1$ and $a_2$ are imparted to the antiferromagnetic films 17 and 18, both made of $Fe_{50}Mn_{50}$. The magnetic films 14, which are made of $Co_{90}Fe_{10}$ and exchange-coupled to the antiferromagnetic films 17 and 18, respectively, are fixedly magnetized and thus have magnetic anisotropies $b_1$ and $b_2$, respectively. The magnetic anisotropy $b_1$ is identical to the magnetic anisotropy $a_1$ of the antiferromagnetic film 17, and the magnetic anisotropy $b_2$ is identical to the magnetic anisotropy $a_2$ of the antiferromagnetic film 18. Thus, the antiferromagnetic films 17 and 18, which are the outermost layers of the head, are magnetized in the opposite directions, and the magnetic films 14 of the spin-valve units 12 and 13 are magnetized in the opposite directions.

Magnetic anisotropy can be imparted to each film by applying an external DC magnetic field onto the film being formed in the direction desired for the magnetic anisotropy. The anisotropy can easily be changed in direction, by altering the direction in which to apply the external DC magnetic field. An alternative method of changing the magnetic anisotropy is to change the blocking temperatures of both antiferromagnetic films 17 and 18 by heating these films 17 and 18 in a magnetic field. To be more precise, the film 17 is first heated in a magnetic field to temperature T lower than its blocking temperature $T_1$, thus acquiring magnetic anisotropy of a desired direction. Next, the film 18 is first heated in a magnetic field to temperature T somewhere between temperature $T_1$ and the blocking temperature $T_2$ of the film 18, which is higher than temperature $T_1$, thereby acquiring magnetic anisotropy of a direction different from that of the anisotropy of the film 17.

Each magnetic film 16 made of $Co_{90}Fe_{10}$, interposed between the nonmagnetic films 11 and 15 which are made of TiN and Cu, respectively, has a magnetization-easy axis which extends in the direction of supplying sense currents $I_S$. The film 16 of the first spin-valve unit 12 is magnetized in the direction of an arrow $c_1$, and the film 16 of the second spin-valve unit 13 is magnetized in the direction of an arrow $c_2$. The magnetic films 14, made of $Co_{90}Fe_{10}$ and contacting the $Fe_{50}Mn_{50}$ antiferromagnetic films 17 and 18, are fixedly magnetized by exchange bias magnetic fields. Thus, it is only the $Co_{90}Fe_{10}$ magnetic films 16 which are magnetized in response to a signal magnetic field $H_{SIG}$ applied externally.

As illustrated in FIG. 11, the signal magnetic field $H_{SIG}$ extends parallel to the interfaces among the films of the MR head and perpendicularly to the sense currents $I_S$. Therefore, the magnetic films 16 made of $Co_{90}Fe_{10}$ are magnetized in the directions of arrows $d_1$ and $d_2$ when they receive signal magnetic fields of the same polarity. That is, the magnetization directions in the films 16 change.

FIG. 12 is a diagram representing how the resistances of the spin-valve units 12 and 13 depend on signal magnetic fields $H_{SIG}$, and also explaining how the MR head shown in FIG. 9 performs a differential operation.

When signal magnetic fields of the same polarity are applied to the spin-valve units 12 and 13, the resistance of one spin-valve unit increases, while the resistance of the other spin-valve unit decreases as shown in FIG. 12. As a result, the resistances of the units 12 and 13 cancel out each other, and no resistance change occurs in the MR head. On the other hand, signal magnetic fields of the opposite polarities are applied to the spin-valve units 12 and 13, the resistances of both spin-valve units are either high or low. In this case, the resistances of the units 12 and 13 strengthen each other, and a large resistance change occurs in the MR head. Thus, the MR head according to the ninth embodiment works as a reading head which performs an differential operation on a magnetization-reversed region of the recording medium 20.

The $Fe_{50}Mn_{50}$ antiferromagnetic films 17 and 18 apply two exchange bias magnetic fields onto the outer $Co_{90}Fe_{10}$ magnetic films of the spin-valve units 12 end 13, respectively. Furthermore, the $Co_{90}Fe_{10}$ magnetic films 16 of both spin-valve units 12 and 13 have each magnetic anisotropy in a widthwise direction of the tracks of the magnetic recording medium 20. The spin-valve units 12 and 13 become a single magnetic domain, generating no Barkhausen noise. Since the MR head performs a differential operation, it has high linear recording resolution, high sensitivity, high S/N ratio, and high reliability.

Embodiment 10

FIG. 13 is an exploded perspective view shown an MR head according to the tenth embodiment of the present invention. As shown in FIG. 13, this MR head is identical to the ninth embodiment (FIG. 9) as regards the multilayer structure. Magnetic anisotropies $a_3$ and $b_3$ of the same direction are imparted to the antiferromagnetic layer 17 and the magnetic layer 14 of the first spin-valve unit 12, respectively. Magnetic anisotropies $a_4$ and $b_4$, which are opposite in direction to the magnetic anisotropies $a_3$ and $b_3$, are imparted to the antiferromagnetic layer 18 and the magnetic layer 14 of the second spin-valve unit 13, respectively. In other words, the films 14, 17 and 18 are fixedly magnetized. Signal magnetic fields $H_{SIG}$ are applied to the MR head, in a direction parallel to the magnetic anisotropies of the films 14, 17 and 18, whereas sense currents $I_S$ are supplied in a direction perpendicular thereto. The magnetic anisotropy imparted to the $Co_{90}Fe_{10}$ magnetic film 16 of each spin-valve unit, which is shielded from the exchange bias magnetic fields generated from the antiferromagnetic films 17 and 18, differ by 90° from the magnetic anisotropy of the corresponding magnetic films 16 incorporated in the ninth embodiment. Namely, the magnetic films 16 of both spin-valve units 12 and 13 have magnetic anisotropies which are perpendicular to the flowing direction of the sense currents $I_S$ and which are paralled and opposite to each other. More specifically, the magnetic film 16 of the first spin-valve unit 12 has upward magnetic anisotropy $c_3$ which is perpendicular to the sense currents $I_S$, and the magnetic film 16 of the second spin-valve unit 13 has downward magnetic anisotropy $c_4$ which is perpendicular to the sense currents $I_S$.

FIG. 14 illustrates the relationship between the signal magnetic fields $H_{SIG}$ applied to the MR head and the electric resistances of the spin-valve units 12 and 13. With reference to FIG. 14, the differential operation the MR head performs will be explained.

The resistances R of the spin-valve units 12 and 13 have hysteresis shown in FIG. 14, varying in accordance with the intensity of the signal magnetic field which changes between $H_{SIG}+H_c$ and $H_{SIG}-H_c$. This is because the $Co_{90}Fe_{10}$ magnetic films 16 undergo magnetization reversal. To be more precise, the first spin-valve unit 12 has hysteresis indicated by a broken-line arrows, and the second spin-valve unit 13 has hysteresis indicated by a solid-line arrows. Due to the sense currents $I_S$, the hysteresis of the first spin-valve unit 12 shifts to the positive side, whereas the hysteresis of the second spin-valve unit 12 shifts to the negative side. When signal magnetic fields of the same polarity, each having an intensity over+$H_c$, are applied to the spin-valve units 12 and 13, the electric resistance of the unit 12 decreases, whereas that of the unit 13 increases. The resistances of the units 12 and 13 therefore cancel out each other, whereby no resistance change takes place in the MR head. Conversely, when signal magnetic fields of the opposite polarities are applied to the spin-valve units 12 and 13, the resistances of the units 12 and 13 either increase or decrease. In this case, the resistances of the units 12 and 13 strengthen each other, and a resistance change occurs in the MR head. Thus, the MR head performs a differential operation on the signal magnetic fields.

The head has high linear recording resolution, high sensitivity, high S/N ratio, and high reliability.

Embodiment 11

Figure 16:
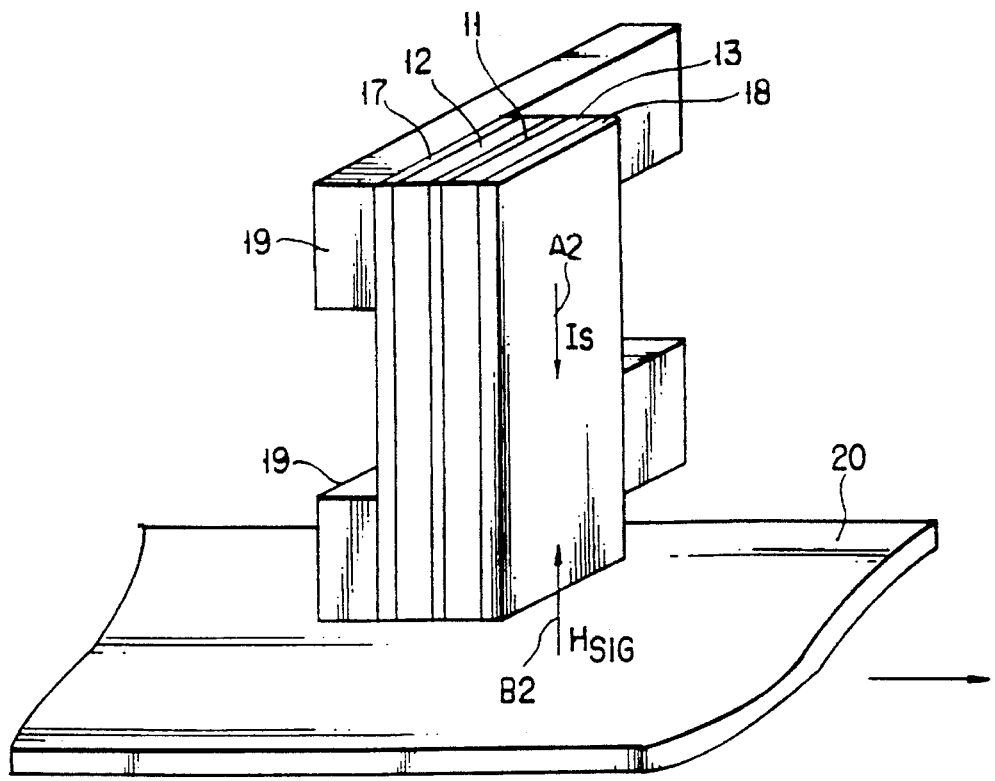
FIG. 16 is a perspective view showing the MR head shown in FIG. 15.

As may be understood from FIG. 15, the MR head according to the eleventh embodiment of this invention has the same multilayer structure as the ninth embodiment (FIG. 9). However, it is so positioned with respect to a magnetic recording medium 20 such that, as shown in FIG. 16, sense currents $I_S$ and a signal magnetic field $H_{SIG}$ are parallel and opposite, as indicated by arrows $A_2$ and $B_2$. That is to say, the signal magnetic field $H_{SIG}$ is applied in parallel to the sense currents $I_S$.

Figure 17:
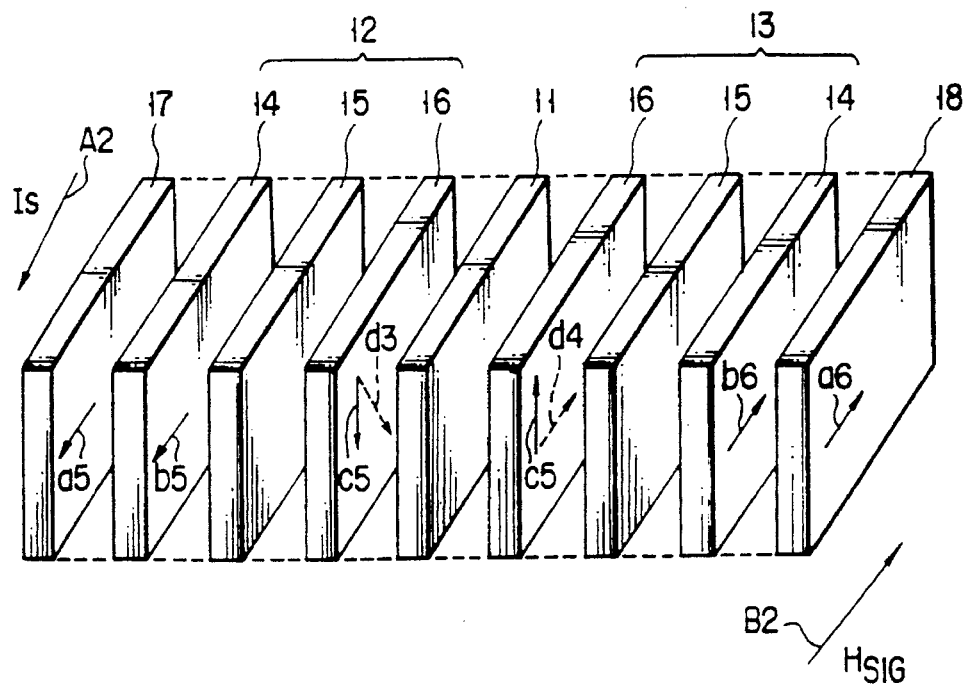
FIG. 17 is an exploded perspective view of the head shown in FIG. 15, depicting the directions in which the layers constituting the head are magnetized.

FIG. 17 is an exploded perspective view of the head shown in FIG. 15, depicting the directions in which the layers constituting the head are magnetized. As is seen from FIG. 17, the sense currents $I_S$ flow in the direction of an arrow $A_2$. The $Fe_{50}Mn_{50}$ antiferromagnetic films 17 and 18 and the $Co_{90}Fe_{10}$ magnetic films 14, both exchange-coupled to the films 17 and 18, are given anisotropies of the direction in which the sense currents $I_S$ have been supplied. At this time, in the first spin-valve unit 12 an exchange bias magnetic field is applied in the direction in which the sense currents $I_S$ are flowing, thus fixedly magnetizing the $Co_{90}Fe_{10}$ magnetic film 14 in the direction of an arrow $b_5$—that is, along a line perpendicular to the surface of the medium 20. In the second spin-valve unit 13, an exchange bias magnetic field is applied in the direction opposite to the direction in which the sense currents $I_S$ are flowing, thus fixedly magnetizing the $Co_{90}Fe_{10}$ magnetic film 14 in the direction of an arrow $b_6$—that is, in the direction opposite to the direction in which the film 14 of the first spin-valve unit 12 is magnetized.

The magnetized direction of the $Co_{90}Fe_{10}$ magnetic film 16 of each spin-valve unit is identical to the direction in which the magnetic field generated by the sense currents $I_s$ are applied to the unit. More precisely, the film 16 of the first spin-valve unit 12 is magnetized downwards, in the direction of an arrow $c_5$, whereas the film 16 of the second spin-valve unit 13 is magnetized upwards, in the direction of an arrow $c_6$. As shown in FIG. 17, a signal magnetic field $H_{SIG}$ is parallel to the interfaces among the films of the MR head and also to the sense currents I. Thus, when two signal magnetic fields of the same polarity are applied to the spin-valve units 12 and 13 which are magnetically isolated by the TiN nonmagnetic film 11, magnetization reversals will occur in the $Co_{90}Fe_{10}$ magnetic films 16 as indicated by, for example, arrows $d_3$ and $d_4$ in FIG. 17.

The resistances of the spin-valve units 12 and 13 depend on the signal magnetic fields as shown in FIG. 12—that is, in the same manner as the resistances of the units 12 and 13 of the ninth embodiment (FIG. 9). More specifically, when signal magnetic fields of the same polarity are applied to the units 12 and 13, the resistance of these units decreases, whereas that of the unit 13 increases. The resistances of the units 12 and 13 therefore cancel out each other, whereby no resistance change takes place in the MR head. Conversely, when signal magnetic fields of the opposite polarities are applied to the units 12 and 13, the resistances of these units either increase or decrease. In this case, the resistances of the units 12 and 13 strengthen each other, and a resistance change occurs in the MR head. Thus, the MR head performs a differential operation on the signal magnetic fields.

The MR head according to the eleventh embodiment also has high linear recording resolution, high sensitivity, high S/N ratio, and high reliability.

Embodiment 12

The MR head according to the twelfth embodiment of the invention, which has the same multilayer structure as the eleventh embodiment, will be described with reference to FIG. 18. As shown in FIG. 18, the sense currents $I_S$ are supplied in the same direction, and the signal magnetic field is applied in the same direction, as in the eleventh embodiment. In the second spin-valve unit 13, the $Fe_{50}Mn_{50}$ antiferromagnetic film 18 applies an exchange bias magnetic field in the direction of an arrow $a_8$, which is identical to the direction of supplying the sense currents $I_S$, and the $Co_{90}Fe_{10}$ magnetic film 16 is magnetized in the direction of an arrow $b_8$ which is also identical to the direction of supplying the sense currents $I_S$. In the first spin-valve unit 12, the $Fe_{50}Mn_{50}$ antiferromagnetic film 18 applies an exchange bias magnetic field in the direction of an arrow $a_7$, which is opposite to the direction of supplying the sense currents $I_S$, and the $Co_{90}Fe_{10}$ magnetic film 14 is magnetized in the direction of an arrow $b_7$ which is also opposite to the direction of supplying the sense currents $I_S$. The $Co_{90}Fe_{10}$ magnetic films 16 of both spin-valve units 12 and 13 are magnetized in the same direction as the flowing direction of the sense currents $I_S$.

The differential operation of the MR head will be explained, with reference to FIG. 19 which represents the relationship between the intensity of the signal magnetic field $H_{SIG}$ and the electric resistance R of the MR head.

When a signal magnetic field is applied to the MR head, the resistances of the spin-valve units 12 and 13 change as shown in FIG. 19. More precisely, the spin-valve units 12 and 13 have resistance hystereses indicated by broken-line arrows and solid-line arrows, respectively. Their resistances R changes as the intensity of the signal magnetic field which varies between $H_{SIG}+H_c$ and $H_{SIG}-H_c$. When signal magnetic fields of the same polarity, each having an intensity over+$H_c$, are applied to the spin-valve units 12 and 13, the resistance R of the unit 12 decreases, whereas the resistance R of the unit 13 increases. The resistances R of the units 12 and 13 therefore cancel out each other, whereby no resistance change takes place in the MR head. Conversely, when signal magnetic fields of the opposite polarities are applied to the spin-valve units 12 and 13, the resistances R of the units 12 and 13 either increase or decrease. In this case, the resistances R of the units 12 and 13 strengthen each other, and a resistance change occurs in the MR head. Thus, the MR head performs a differential operation on the signal magnetic fields.

Like the ninth embodiment, the MR therefore does not generate Barkhausen noise. It has high linear recording resolution, high sensitivity, high S/N ratio, and high reliability.

Embodiment 13.

The MR head according to the thirteenth embodiment of this invention will now be described, with reference to FIGS. 20, 21 and 22.

FIG. 20 shows the positional relationship between the MR head and a magnetic recording medium 20. As can been seen from FIG. 20, the head comprises two magnetic films 21 and 22 made of $Ni_{80}Fe_{20}$ (hereinafter referred to as "Permalloy"), an intermediate nonmagnetic film 11 made of TiN and interposed between the magnetic films 21 and 22, and two antiferromagnetic films 17 and 18 made of $Fe_{50}Mn_{50}$ and formed on the outer surfaces of the Permalloy magnetic films 21 and 22, respectively. Two electrodes 19 are connected to the first $Fe_{50}Mn_{50}$ antiferromagnetic film 17. More specifically, the head has been produced by forming, on a substrate (not shown), the $Fe_{50}Mn_{50}$ antiferromagnetic film 18 (thickness: 15 nm), the Permalloy magnetic film 22 (thickness: 25 nm), the TiN intermediate nonmagnetic film 11 (thickness: 30 nm), the Permalloy magnetic film 21 (thickness: 25 nm), and the $Fe_{50}Mn_{50}$ antiferromagnetic film 17 (thickness: 15 nm)—one upon another, in the order mentioned. As shown in FIG. 20, sense currents $I_S$ flow in the direction of an arrow $A_3$, in a widthwise direction of the tracks of the recording medium 20, while signal magnetic fields $H_{SIG}$ generated from the medium 20 are applied in the direction of an arrow $B_3$, in a direction parallel to the interfaces of the films and perpendicular to the sense currents $I_S$.

FIG. 21 is an exploded perspective view of the MR head shown in FIG. 20. As seen from FIG. 20, the $Fe_{50}Mn_{50}$ antiferromagnetic films 17 and 18 apply exchange bias magnetic fields $H_T$ to the Permalloy magnetic films 21 and 22, respectively, which contact the films 17 an 18. These magnetic fields $H_T$ extend parallel to the direction in which the sense currents flow, as is indicated by arrows $e_1$ and $e_2$. Two operation-point bias magnetic fields $H_B$, generated by the sense currents $I_S$, are applied onto the Permalloy films 21 and 22 magnetically isolated by the TiN intermediate nonmagnetic film 11, in the directions of arrows $f_1$ and $f_2$. Thus, a composite bias magnetic field extending slantwise and downwards is applied to the Permalloy magnetic film 21, whereas a composite bias magnetic field extending slantwise and upwards is applied to the Permalloy magnetic film 22. As a result of this, the magnetic films 21 and 22 are magnetized fixedly in the directions of arrows $g_1$ and $g_2$, respectively.

FIG. 22 is a diagram representing the relationship between the signal magnetic fields applied to the MR head, on the one hand, and the resistance R of the head, on the other. With reference to FIG. 22, it will be explained how the MR head performs an differential operation.

When signal magnetic fields of the same polarity are applied to the MR head, the resistance of the Permalloy film 22 decreases, whereas the resistance of the Permalloy film 21 first increases and then decreases. Hence, unless the signal magnetic fields are excessively intense, the resistances of the magnetic films 21 and 22 cancel out each other, whereby no resistance change takes place in the MR head. On the other hand, when signal magnetic fields of the opposite polarities are applied to the MR head, the resistances of the magnetic films 21 and 22 either increase or decrease. In this case, the resistances of the magnetic films 21 and 22 strengthen each other, and a resistance change occurs in the MR head. Thus, the MR head performs a differential operation to generate an output voltage.

Since the $Fe_{50}Mn_{50}$ antiferromagnetic films 17 and 18 apply exchange bias magnetic fields onto the Permalloy magnetic films 21 and 22, the films 21 and 22 become a single magnetic domain, generating no Barkhausen noise. Moreover, the MR head, which performs a differential operation, has high linear recording resolution, high sensitivity, high S/N ratio, and high reliability.

Embodiment 14

Figure 23:
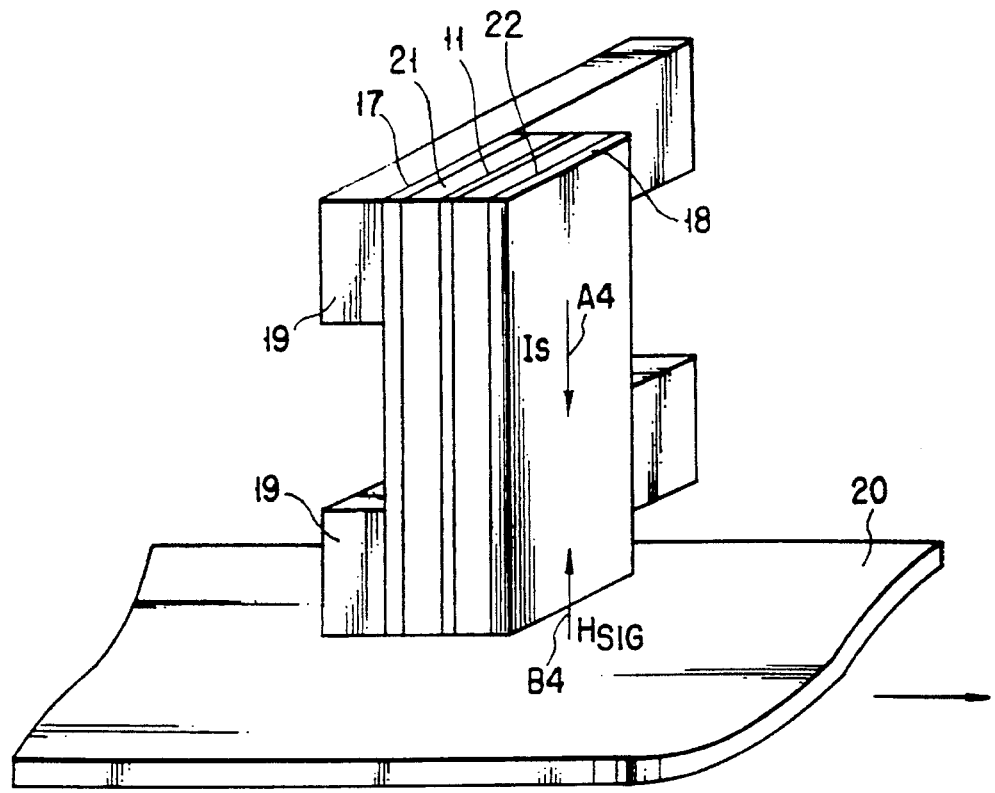
FIG. 23 is a perspective view showing an MR head according to a fourteenth embodiment of this invention.

The MR head according to the fourteenth embodiment of this invention will be described, with reference to FIGS. 23 and 24. As can be understood from FIG. 23, this MR head is identical in structure to the thirteenth embodiment (FIG. 20). In use, the MR head is positioned with respect to a magnetic recording medium such that signal magnetic fields $H_{SIG}$ generated from the medium 20 are applied in the direction of an arrow $B_4$, that is, parallel to sense currents $I_S$ flowing in the direction of an arrow $A_4$.

Figure 24:
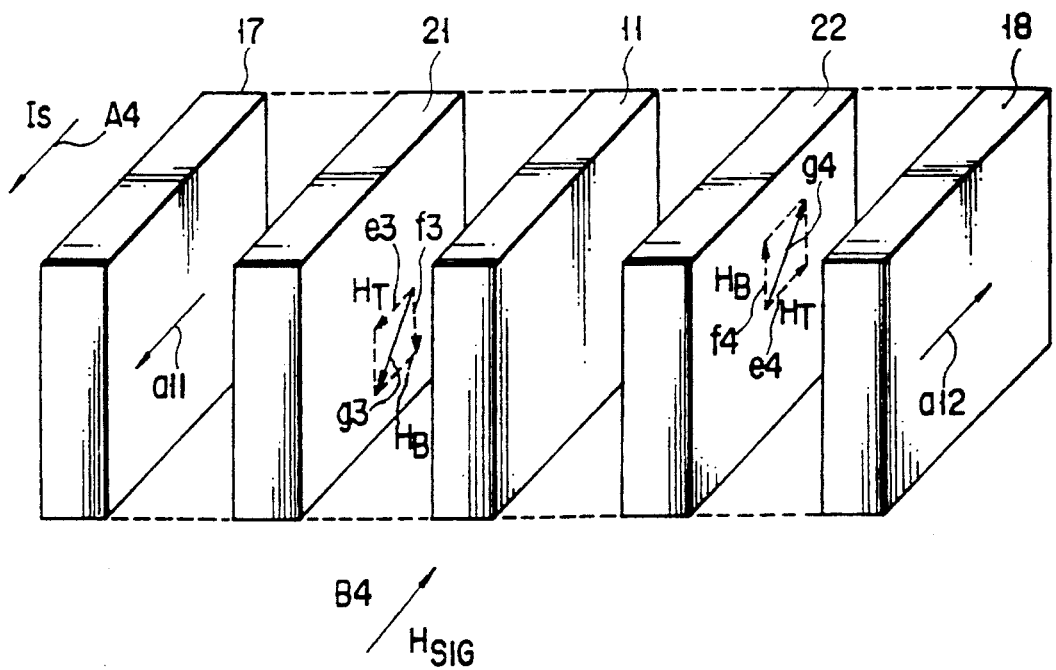
FIG. 24 is an exploded perspective view of the head shown in FIG. 23, representing the directions in which the layers constituting the head are magnetized.

With reference to FIG. 24 which is an exploded perspective view of the MR head, the directions in which the films of the head are magnetized will be explained. The $Fe_{50}Mn_{50}$ antiferromagnetic film 17 applies to the Permalloy film 21 an exchange bias magnetic field $H_T$ which extends in the same direction as the sense current $I_S$, as indicated by an arrow $e_3$. On the other hand, the $Fe_{50}Mn_{50}$ antiferromagnetic film 18 applies to the Permalloy film 22 an exchange bias magnetic field $H_T$ which extends in the opposite direction to the sense current $I_S$, as indicated by an arrow $e_4$. Two operation-point bias magnetic fields $H_B$, generated by the sense currents $I_S$, are applied onto the Permalloy films 21 and 22 magnetically isolated by the TiN intermediate nonmagnetic film 11, in the directions of arrows $f_3$ and $f_4$. As a result, two composite magnetic fields are applied onto the magnetic films 21 and 22, respectively, in the directions of arrows $g_3$ and $g_4$, whereby the magnetic films 21 and 22 are fixedly magnetized.

When signal magnetic fields $H_{SIG}$ are applied to the MR head in this condition, the resistance changes will take place in the Permalloy magnetic films 21 and 22 in the same way as illustrated in FIG. 22. Therefore, the MR head performs a differential operation to generate an output voltage, and has high linear recording resolution, high sensitivity, high S/N ratio, and high reliability.

As has been described, the present invention can provide an MR head which is simple in structure, which generates but little Barkhausen noise, and which can perform a differential operation. The MR head, therefore, has high sensitivity, high S/N ratio, high linear recording resolution and high reliability, and possesses a great industrial value.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A magnetoresistive head comprising:

a first spin-valve unit formed of a first inner magnetic film, a first outer magnetic film and a nonmagnetic film interposed between and in direct physical contact with the first inner magnetic film and the first outer magnetic film;

a second spin-valve unit formed of a second inner magnetic film, a second outer magnetic film and a nonmagnetic film interposed between and in direct physical contact with the second inner magnetic film and the second outer magnetic film; and an antiferromagnetic portion interposed between the first and second spin-valve units, and formed of a first antiferromagnetic sublayer and a second antiferromagnetic sublayer laminated on said first antiferromagnetic sublayer, said first antiferromagnetic sublayer being in direct physical contact with said first inner magnetic film, and said second antiferromagnetic sublayer being in direct physical contact with said second inner magnetic film, wherein sense current supply directions through said first and second spin-valve units are perpendicular to a head facing surface of a magnetic recording medium, said first antiferromagnetic sublayer applies a first exchange bias magnetic field to said first inner magnetic film in a direction perpendicular to the surface of the magnetic recording medium, and said second antiferromagnetic sublayer applies a second exchange bias magnetic field to said second inner magnetic film in a direction perpendicular to the surface of the magnetic recording medium, said second exchange bias magnetic field having a polarity opposite to that of said first exchange bias magnetic field.

2. The magnetoresistive head according to claim 1, further comprising a nonmagnetic film interposed between said first and second antiferromagnetic sublayers.

3. The magnetoresistive head according to claim 1, wherein said antiferromagnetic sublayers are made of a material selected from the group consisting of FeMn, NiO and PdMn.

4. The magnetoresistive head according to claim 1, wherein said antiferromagnetic portion has a thickness of 2 to 100 nm.

5. A magnetic write/read apparatus equipped with a magnetoresistive head for reading information recorded in a magnetic recording medium, wherein said magnetoresistive head comprises:

a first spin-valve unit formed of a first inner magnetic film, a first outer magnetic film and a nonmagnetic film interposed between and in direct physical contact with the first inner magnetic film and the first outer magnetic film;

a second spin-valve unit formed of a second inner magnetic film, a second outer magnetic film, and a nonmagnetic film interposed between and in direct physical contact with the second inner magnetic film and the second outer magnetic film; and an antiferromagnetic portion interposed between the first and second spin-valve units, and formed of a first antiferromagnetic sublayer and a second antiferromagnetic sublayer laminated on said first antiferromagnetic sublayer, said first antiferromagnetic sublayer being in direct physical contact with said first inner magnetic film and said second antiferromagnetic sublayer being in direct physical contact with said second inner magnetic film, wherein sense current supply directions through said first and second spin-valve units are perpendicular to a head facing surface of the magnetic recording medium, said first antiferromagnetic sublayer applies a first exchange bias magnetic field to said first inner magnetic film in a direction perpendicular to the surface of the magnetic recording medium, and said second antiferromagnetic sublayer applies a second exchange bias magnetic field to said second inner magnetic film in a direction perpendicular to the surface of the magnetic recording medium, said second exchange bias magnetic field having a polarity opposite to that of said first exchange bias magnetic field.

6. The magnetoresistive head according to claim 5, further comprising a nonmagnetic film interposed between said first and second antiferromagnetic sublayers.

7. The magnetoresistive head according to claim 5, wherein said antiferromagnetic sublayers are made of a material selected from the group consisting of FeMn, NiO and PdMn.

8. The magnetoresistive head according to claim 5, wherein said antiferromagnetic portion has a thickness of 2 to 100 nm.

* * * * *